(12) United States Patent
Lee et al.

(10) Patent No.: US 7,452,120 B2
(45) Date of Patent: Nov. 18, 2008

(54) ILLUMINATION APPARATUS AND FILM

(75) Inventors: Junwon Lee, Webster, NY (US); Randall H. Wilson, Albuquerque, NM (US); Charles M. Rankin, Jr., Penfield, NY (US); Stephen C. Meissner, West Henrietta, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 96 days.

(21) Appl. No.: 11/671,070

(22) Filed: Feb. 5, 2007

(65) Prior Publication Data

US 2007/0223247 A1    Sep. 27, 2007

Related U.S. Application Data

(63) Continuation-in-part of application No. 11/626,393, filed on Jan. 24, 2007, which is a continuation-in-part of application No. 11/388,582, filed on Mar. 24, 2006.

(51) Int. Cl.
    *F21V 5/00*    (2006.01)
(52) U.S. Cl. .................. 362/627; 362/618; 362/606; 362/309; 362/223; 362/330
(58) Field of Classification Search ................ 362/618, 362/627, 606, 607, 326, 330, 332, 639, 308, 362/309, 222, 223, 329
    See application file for complete search history.

(56) References Cited

U.S. PATENT DOCUMENTS

| | | | |
|---|---|---|---|
| 4,984,144 A | 1/1991 | Cobb et al. | |
| 5,396,350 A | 3/1995 | Beeson et al. | |
| 5,598,281 A | 1/1997 | Zimmerman et al. | |
| 5,629,784 A | 5/1997 | Abileah et al. | |
| 5,739,931 A | 4/1998 | Zimmerman et al. | |
| 5,761,355 A | 6/1998 | Kuper et al. | |
| 5,917,664 A | 6/1999 | O'Neill et al. | |
| 5,986,728 A * | 11/1999 | Bernard | 349/68 |
| 6,106,128 A * | 8/2000 | Zou et al. | 362/606 |
| 6,111,696 A | 8/2000 | Allen et al. | |
| 6,129,439 A | 10/2000 | Hou et al. | |
| 6,277,471 B1 | 8/2001 | Tang | |
| 6,280,063 B1 | 8/2001 | Fong et al. | |
| 6,354,709 B1 | 3/2002 | Campbell et al. | |
| 6,356,391 B1 | 3/2002 | Gardiner et al. | |

(Continued)

FOREIGN PATENT DOCUMENTS

JP    8-221013    8/1996

*Primary Examiner*—Laura Tso
(74) *Attorney, Agent, or Firm*—Edwin Oh

(57) ABSTRACT

An illumination apparatus comprises:
  (a) at least one light source;
  (b) a light guide for accepting light from the at least one light source and for guiding the light using total internal reflection, the light guide having a top surface;
  (c) a light extracting film having an input surface optically coupled with the top surface and an output surface for providing light,
  wherein the input surface comprises a plurality of features which are optically coupled to the top surface of the light guide, such features having:
    (i) a first side comprising two or more planar segments; and
    (ii) a second side comprising two or more planar segments, and
  wherein either the length of at least some of the features is less than the width of the film or the first and second sides intersect at an apex.

34 Claims, 31 Drawing Sheets

U.S. PATENT DOCUMENTS

| | | |
|---|---|---|
| 6,425,675 B2 | 7/2002 | Onishi et al. |
| 6,811,274 B2 * | 11/2004 | Olczak ...................... 362/606 |
| 6,846,089 B2 | 1/2005 | Stevenson et al. |
| 2005/0134963 A1 | 6/2005 | Stevenson et al. |
| 2006/0051048 A1 | 3/2006 | Gardiner et al. |
| 2006/0250817 A1 * | 11/2006 | Yamashita et al. .......... 362/606 |

* cited by examiner

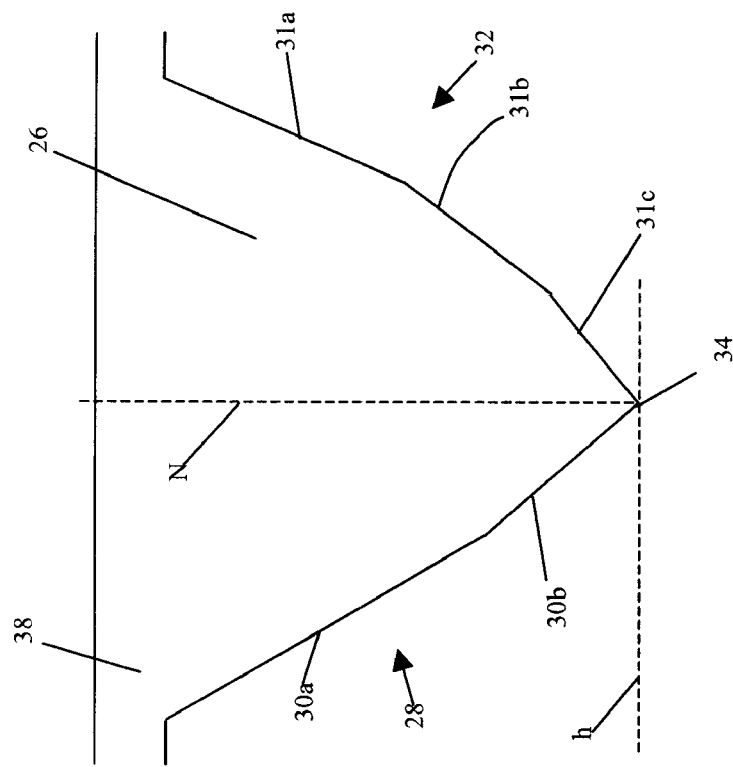
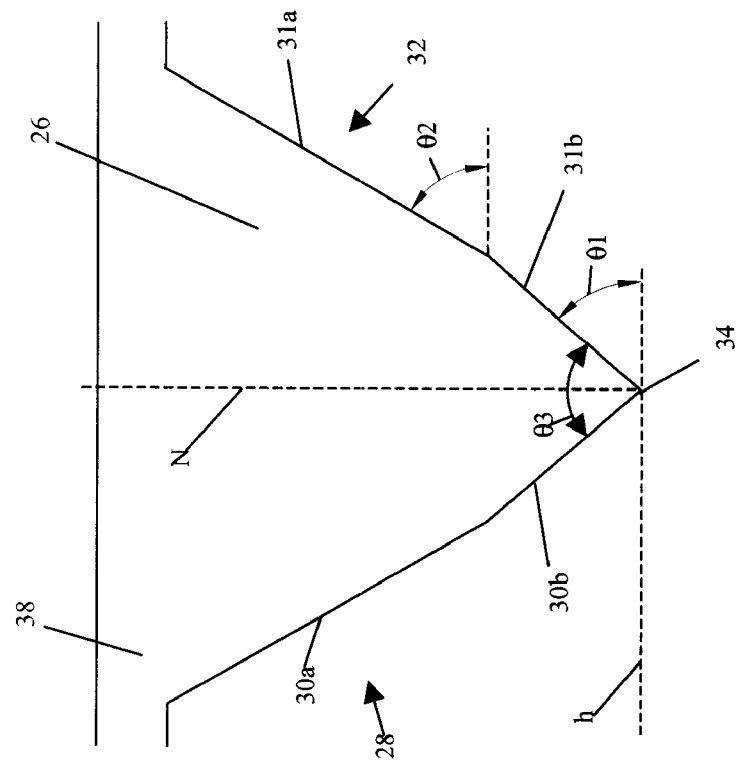
Fig. 4A
Fig. 4B

ILLUMINATION APPARATUS AND FILM

CROSS-REFERENCE TO RELATED APPLICATION

This application is a Continuation-in-part of U.S. Ser. No. 11/626,393 filed on Jan. 24, 2007, which is in turn a Continuation-in-part of U.S. Ser. No. 11/388,582 filed on Mar. 24, 2006, the contents of which are incorporated herein by reference.

FIELD OF THE INVENTION

The present invention generally relates to an illumination apparatus and optical film, and more particularly relates to a light extracting film using an arrangement of features for conditioning illumination for use in display and lighting applications.

BACKGROUND OF THE INVENTION

While liquid crystal displays (LCDs) offer a compact, lightweight alternative to cathode ray tube (CRT) monitors, there are many applications for which LCDs are not satisfactory due to a low level of brightness, or more properly, luminance. The transmissive LCD that is used in known laptop computer displays is a type of backlit display, having a light-providing surface positioned behind the liquid crystal (LC) array for directing light outwards, towards the LCD. The light-providing surface itself provides illumination that is essentially Lambertian, having an essentially constant luminance over a broad range of angles.

With the goal of increasing on-axis and near-axis luminance, a number of brightness enhancement films have been proposed for redirecting a portion of this light having Lambertian distribution toward normal, relative to the display surface. There have been many proposed solutions for brightness or luminance enhancement for use with LCD displays and with other types of backlit display types.

U.S. Pat. No. 6,111,696 (Allen et al.) describes a brightness enhancement film for a display or lighting fixture. The surface of the optical film facing the illumination source is smooth and the opposite surface has a series of structures, such as triangular prisms, for redirecting the illumination angle. U.S. Pat. No. 5,629,784 (Abileah et al.) describes various embodiments in which a prism sheet is employed for enhancing brightness, contrast ratio, and color uniformity of an LCD display of the reflective type. The brightness enhancement film is arranged with its structured surface facing the source of reflected light for providing improved luminance as well as reduced ambient light effects. U.S. Pat. No. 6,356,391 (Gardiner et al.) describes a pair of optical turning films for redirecting light in an LCD display, using an array of prisms, where the prisms can have different dimensions.

U.S. Pat. No. 6,280,063 (Fong et al.) describes a brightness enhancement film with prism structures on one side of the film having blunted or rounded peaks. U.S. Pat. No. 6,277,471 (Tang) describes a brightness enhancement film having a plurality of generally triangular prism structures having curved facets. U.S. Pat. No. 5,917,664 (O'Neill et al.) describes a brightness enhancement film having "soft" cutoff angles in comparison with known film types, thereby mitigating the luminance change as viewing angle increases.

While known approaches, such as those noted above, provide some measure of brightness enhancement at low viewing angles, these approaches have certain shortcomings. Some of the solutions noted above are more effective for redistributing light over a preferred range of angles rather than for redirecting light toward the normal for best on-axis viewing. These brightness enhancement film solutions often exhibit a directional bias, working best for redirecting light in one direction. For example, a brightness enhancement film may redirect some of the light in the vertical direction to relatively high off-axis angles that is out of the desired viewing cone. In another approach, multiple orthogonally crossed sheets are overlaid in order to redirect light in different directions, typically in both the horizontal and vertical directions with respect to the display surface. Necessarily, this type of approach is somewhat of a compromise; such an approach is not optimal for light in directions diagonal to the two orthogonal axes. In addition, such known films typically use "recycling" in which the light is reflected back through the backlight module multiple times in an effort to increase brightness. However, some of the reflected light is absorbed by materials and lost in reflection during recycling.

As discussed above, brightness enhancement layers have been proposed with various types of refractive surface structures formed atop a substrate material, including arrangements employing a plurality of protruding prism shapes, both as matrices of separate prism structures and as elongated prism structures, with the apex of prisms both facing toward and facing away from the light source. For the most part, these films exhibit directional bias, with some of the light poorly directed.

Certain types of light redirecting layers rely on Total Internal Reflection (TIR) effects for redirecting light. When a light guide is employed and such features are included in contact with the light output surface of the light guide, the features are more correctly termed "light extracting" features since they enable the light to be output rather than simply redirecting existing light. If the light guide is surrounded by air, features are needed to extract the light. These layers include prism, parabolic or aspheric structures, which re-direct light using TIR. For example, U.S. Pat. No. 5,396,350 to Beeson et al., describes a backlight apparatus comprising a slab waveguide and an array of microprisms attached on one face of the slab waveguide. U.S. Pat. Nos. 5,739,931 and 5,598,281 to Zimmerman et al. describe illumination apparatus for backlighting, using arrays of microprisms and tapered optical structures. U.S. Pat. No. 5,761,355 to Kuper et al. describes arrays for use in area lighting applications, wherein guiding optical structures employ TIR to redirect light towards a preferred direction. U.S. Pat. No. 6,129,439 to Hou et al. describes an illumination apparatus in which microprisms utilize TIR for light redirection. Japanese Laid-open Patent Publication No. 8-221013 entitled "Plane Display Device And Backlight Device For The Plane Display Device" by Yano Tomoya (published 1996) describes an illumination apparatus having collimating curved facet projections for light redirection utilizing TIR. U.S. Pat. No. 6,425,675 to Onishi et al., using curved facets similar to those originally described in the Tomoya 8-221013 disclosure, describes an illumination apparatus in which a light output plate also has multiple curved facet projections with their respective tips held in tight contact with the light exit surface of a light guide member.

A number of patent disclosures, such as the Tomoya 8-221013 and '675 Onishi et al. disclosures cited above, employ films having projecting structures and specify that these structures have one or more curved surfaces. While the use of a curved surface for TIR may be useful for providing on-axis light extraction, the design of curved projections for obtaining light over a broader range of angles can be more difficult. Moreover, curved surfaces themselves can prove to be difficult to fabricate, particularly at the dimensional scale that is needed for structures of a light extracting film.

Light extracting films must be optically coupled to their corresponding light guiding component in some way. Embodiments using structures with flat light input surfaces can be optically coupled simply by physical contact with the light guide, provided that this contact is maintained. Embodiments using structures with curved light input surfaces must be held in tight contact against the light guide. In order to prevent the tips of the projections of the light output plate from being embedded in the bonding layer, the bonding agent is semi-hardened beforehand and, after the bonding layer and the tips of the projections are brought to a tight contact each other, the bonding agent is hardened completely, as noted in the Onishi et al. '675 disclosure; however, the use of a two step hardening process, as described, can increase cost and complexity of fabrication. Also described in the art is a method for stacking surface structured optical films in which the structured surface of one film is bonded to an opposing surface of second film using a layer of adhesive by penetrating the structured surface into the adhesive layer to a depth less than a feature height of the structured surface, see U.S. Pat. No. 6,846,089 and U.S. 2005/0134963 A1. This, however, does not provide for more effective light extraction from a light guide plate.

What is needed, therefore, is a light extracting film that overcomes at least the shortcomings of known films previously described and that can be fabricated at reasonable cost.

SUMMARY OF THE INVENTION

As used herein, the terms 'a' or 'an' means one or more, and the term 'plurality' means at least two.

The invention provides an illumination apparatus comprising:
  (a) at least one light source;
  (b) a light guide for accepting light from the at least one light source and for guiding the light using total internal reflection;
  (c) a light extracting film having an input surface optically coupled with the light guide and an output surface parallel to the input surface for providing light,
    wherein the input surface comprises a plurality of light extracting features which are optically coupled to the light guide, such features being extended in a longitudinal direction and having a cross section in the plane perpendicular to the longitudinal direction, the cross section comprising
      (i) a first side comprising at least two but not more than six linear segments, and
      (ii) a second side comprising at least two but not more than six linear segments,
        wherein at least one of the plurality of light extracting features has a length measured in the longitudinal direction that is less than the length of the light extracting film measured in the longitudinal direction.

This invention further provides a light extracting film as described above. Additionally, the invention provides an apparatus and film where at least some of the features have sides comprised of two or more planar segments that meet in an apex.

This invention provides a simplified and integrated light extracting film that leads to easy manufacturing and low cost. This invention also maximizes optical efficiency so as to enhance brightness as well as viewing angle. The film has improved uniform display brightness and decreased interference effects such as Moiré effects. This invention also provides a article that redistributes light over a range of viewing angles.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion. Wherever practical, like reference numerals refer to like elements.

FIGS. 4A and 4B are cross-section views of inventive film features.

DETAILED DESCRIPTION OF THE INVENTION

In the following detailed description, for purposes of explanation and not limitation, example embodiments disclosing specific details are set forth, in order to provide a thorough understanding of the present teachings. However, it will be apparent to one having ordinary skill in the art that other embodiments that depart from the specific details disclosed herein are possible. Moreover, descriptions of well-known devices, methods, and materials may be omitted so as to not obscure the description of the example embodiments. Nonetheless, such devices, methods, and materials that are within the purview of one of ordinary skill in the art may be used in accordance with the example embodiments.

Figure 1:
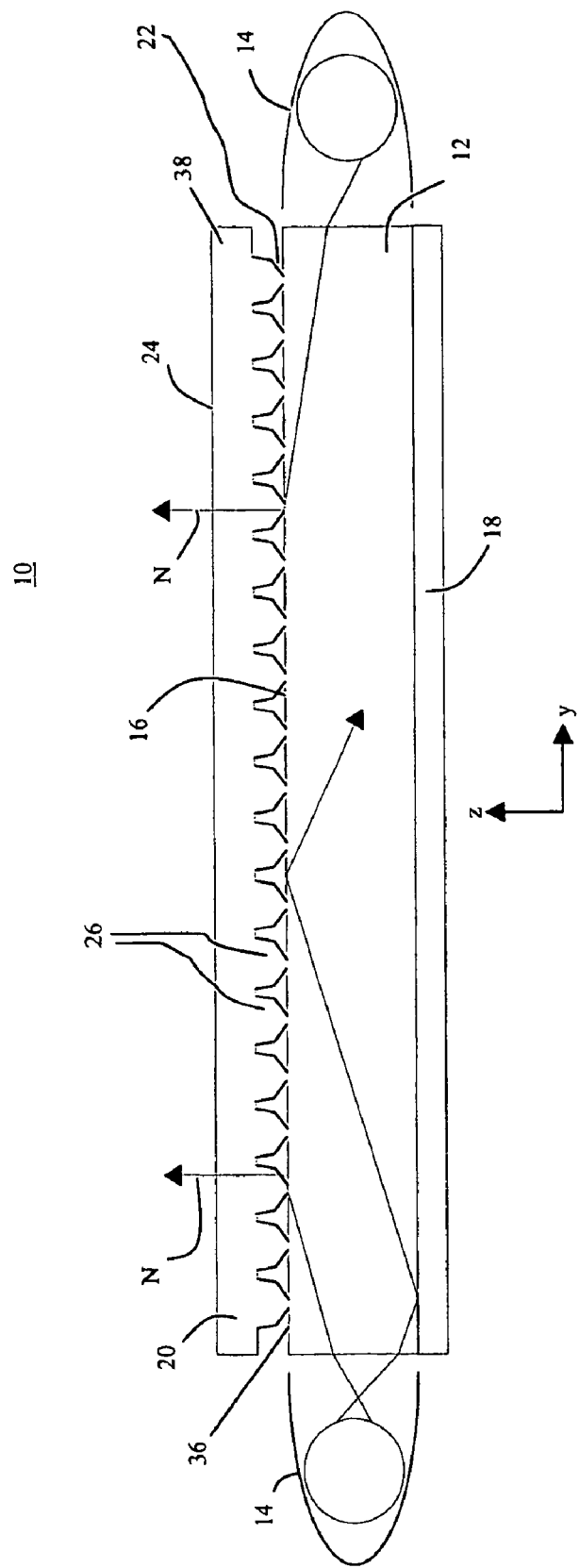
FIG. 1 is a cross sectional view of an illumination apparatus using a film with features according to the present invention.
Figure 2:
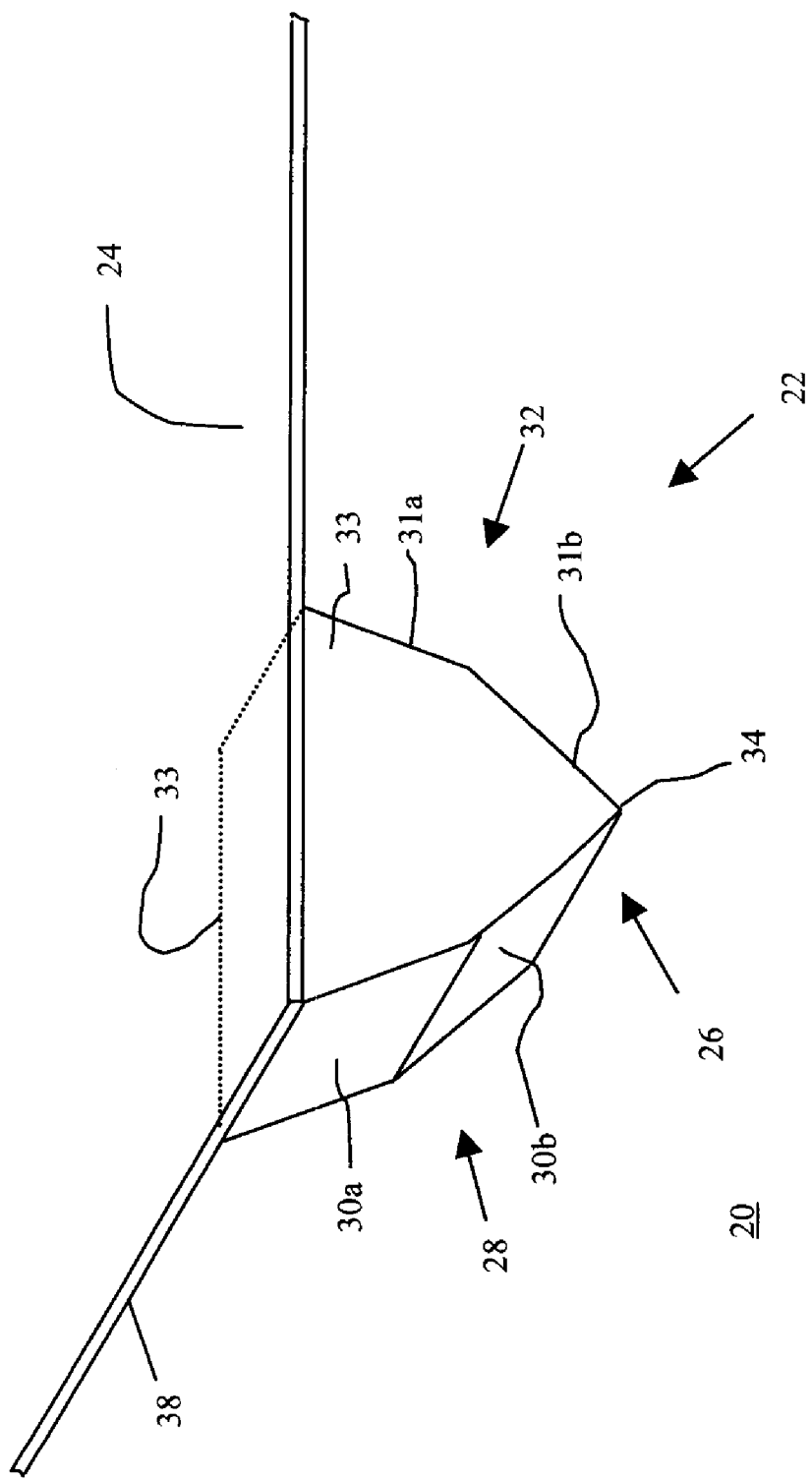
FIG. 2 is a perspective view of a feature in a discrete embodiment.
Figure 3:
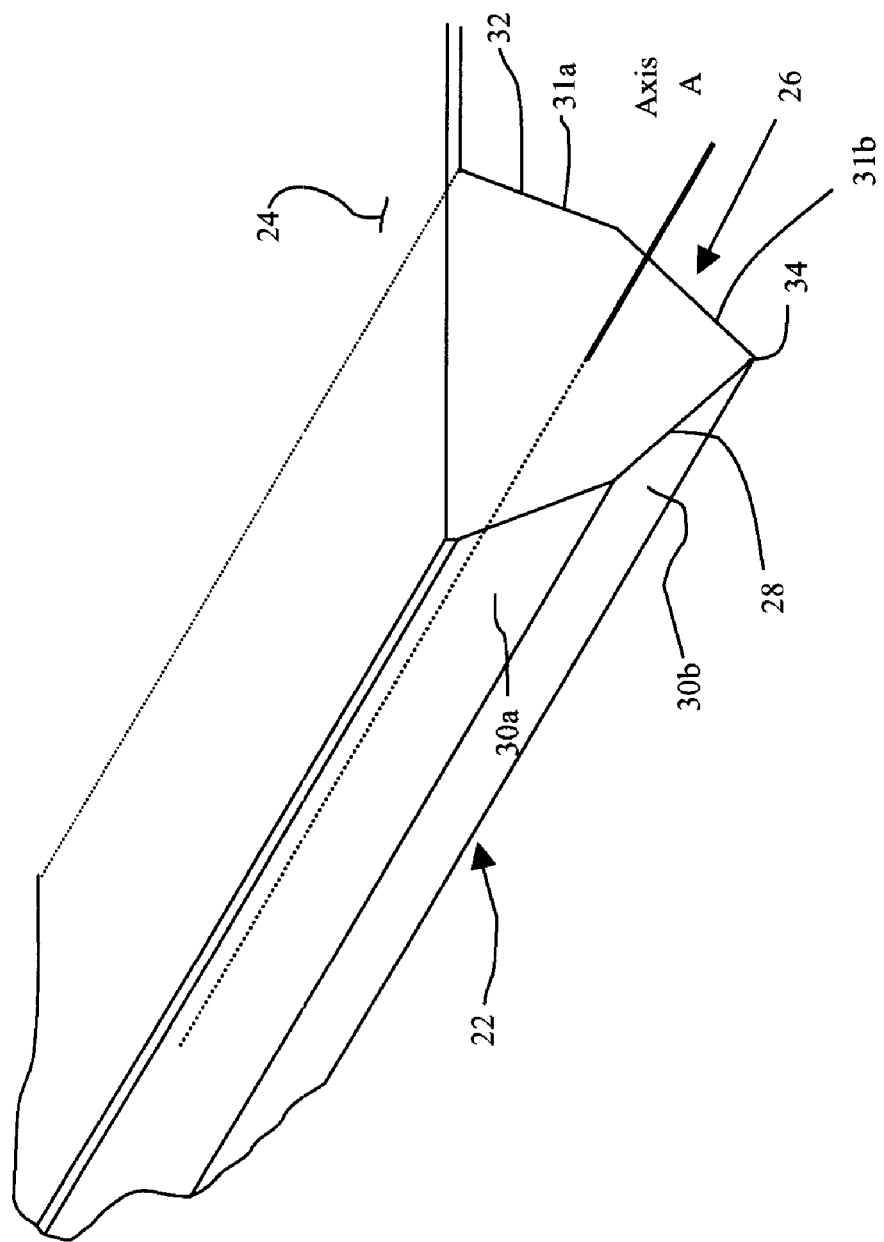
FIG. 3 is a perspective view of a feature in a linearly extended embodiment.

FIG. 1 is a cross-sectional view of an illumination apparatus 10 having a light extracting film 20 optically coupled to the top surface 16 of a light guide 12 in one embodiment, typically coupled using a layer of optical adhesive 36. Light sources 14, typically cold-cathode fluorescent lights (CCFLs) or light-emitting diodes (LEDs) or some other emissive source, provide source illumination to light guide 12, which guides light using TIR. Light extracting film 20 obtains this light at an optical input surface 22 and directs this light toward an output surface 24 at suitable angles for various lighting and display applications. Light extracting film 20 has a plurality of features 26 projecting from a film substrate 38 to form input surface 22 and optically coupled with light guide 12 to obtain and direct the light from light guide 12. Referring to FIG. 2, each light extracting feature 26 has a first side 28 having two or more planar segments 30a, 30b and a second side 32 similarly formed, with two or more planar segments 31a, 31b. Both sides 28 and 32 terminate at an apex 34. In one embodiment, light extracting feature 26 has end faces 33. In one embodiment, light extracting feature 26 is fabricated as a discrete structure, as shown in FIG. 2. With this type of discrete embodiment, light extracting film 20 has multiple light extracting features 26 formed onto or fastened onto film substrate 38 to form input surface 22. In another embodiment the light extracting features 26 are integral to the film substrate, with no boundary between them as shown in FIG. 3. In another embodiment, light extracting film 20 has a plurality of linearly extended light extracting features 26, distributed in rows having various spacing arrangements, as described subsequently. As FIG. 3 shows, the light extracting feature 26 extends in the direction of a longitudinal axis A, such that planar segments 30a, 30b, 31a, and 31b are parallel to the longitudinal axis and axis A is itself parallel to input surface 22. In one embodiment at least two of light extracting features 26 have respective longitudinal axes substantially in parallel with each other, and generally all of the light extracting features 26 are parallel. The light extracting features may be the same length or they may be of different lengths. In one embodiment two or more of the light extracting features may extend the length of the light extracting film. In another embodiment the lengths of at least two of the light extracting features are at least 100 times shorter than the length of the light extracting film measured in the same direction. Preferably the light extracting film 20 has a thickness of about 10.0 microns to about 1.0 mm.

In alternative embodiments, the two sides 28, 32 of the light extracting features 26 may not meet in an apex. For example, the apex may be replaced by a slightly rounded or chamfered tip to relieve the stresses on the apex of the cutting tool used to fabricate the mold. In another example embodiment, the tip of the light extracting features 26 may be widened to form a flat planar segment to improve manufacturing consistency of the light coupling region between the light extracting features 26 and the light guide 12.

It is instructive to point out a number of advantageous characteristics of light extracting features 26 and light extracting film 20. As the term implies, planar segments 30a, 30b, 31a, 31b are flat, without curvature (other than what would be allowed by standard tolerances, such as some small amount of unintended curvature that might result from inherent properties of the composite materials themselves). By comparison with other light extraction solutions, such as those described in the Onishi et al. '675 disclosure cited earlier, in which a cross-section of a projecting element exhibits curvature, the light extracting features 26 of the present invention have transverse cross sections composed only of linear segments. The light output distribution of the light extracting features is highly dependent on the surface slope, and the slopes of cross-sectional linear segments are more easily controlled to tight tolerances than are the slopes of curved cross-sectional segments. By comparison with other light extraction solutions whose cross sections have a single linear segment for each side, the multiple linear segments in the cross section of the present invention provide improved brightness and improved ability to tune the angular light output distribution as desired for display applications.

As would be appreciated by those skilled in the optical design arts, light extracting features 26, optical adhesive 36, and light guide 12 are preferably formed from materials having indices of refraction n that are substantially identical. This improves the extraction of light from light guide 12 and substantially prevents light at the interface from being reflected back into light guide 12.

The transverse cross section of FIG. 4A shows more details for key features of sides 28, 32 in one embodiment. The outmost planar segments 30b and 31b meet or intersect at apex 34, with each of segments 31b and 30b oriented at an angle θ1 relative to the plane of input surface 22, which would be parallel to the horizontal dotted line h in FIG. 4A. In order to meet requirements for TIR in the ideal case, the apex angle θ3 should satisfy:

$$\theta 3 \geq \left(\sin^{-1}\left(\frac{1}{n}\right)\right) \times 2 \quad (1)$$

where n is the index of refraction of the light extracting feature. That is, the relationship given as (1) above would provide TIR at any given incident angle within light guide 12. However, in practice, apex angle θ3 may be smaller than needed to satisfy relationship (1) and still provide very good luminance distribution. After extensive optical simulation, it is found that the luminance distribution is optimal when apex angle θ3 is in the range from approximately 60 degrees to approximately 120 degrees.

Adjacent planar segments 30a and 31a are then disposed at a steeper angle θ2, preferably at least 7 degrees greater than angle θ1, in order to utilize TIR for extracting light into optimal viewing angles. It should be noted that the incidence angle of light increases with increased distance from the apex 34. Thus, it is necessary to increase the slope of successive planar segments in order to direct light in the viewing direction.

Any additional planar segment would be at an angle that is steeper yet, preferably at least 7 degrees greater for each subsequent planar segment, with no angle at or above 90 degrees with respect to the plane of input surface 22. Thus, a maximum of 6 planar segments would be used to form each side 28, 32. Therefore, in one embodiment, the first or second, or both sides 28, 32 may have less than six planar segments. These angular constraints apply whether light extracting feature 26 is formed as a discrete feature and attached to film substrate 38 or is formed into the film substrate itself, such as by molding or embossing, or by machining. Sides 28 and 32 may be symmetrical, or more precisely bilaterally symmetrical, about axis N. Alternately, sides 28 and 32 may be asymmetrical, with different angles θ1 and θ2 used for corresponding planar segments of each side, and/or a different number of planar segments, in order to be better suited to different display applications requiring particular viewing angles, for example. FIG. 4B shows an example cross-section of a light extracting feature 26 that is not symmetric. Side 28 comprises two planar segments 30a and 30b, whereas side 32 comprises three planar segments 31a, 31b, and 31c. Such a light extracting feature 26 might be used to tailor the output angular light distribution to be different when viewed from either side of on-axis viewing direction N.

Figure 5:
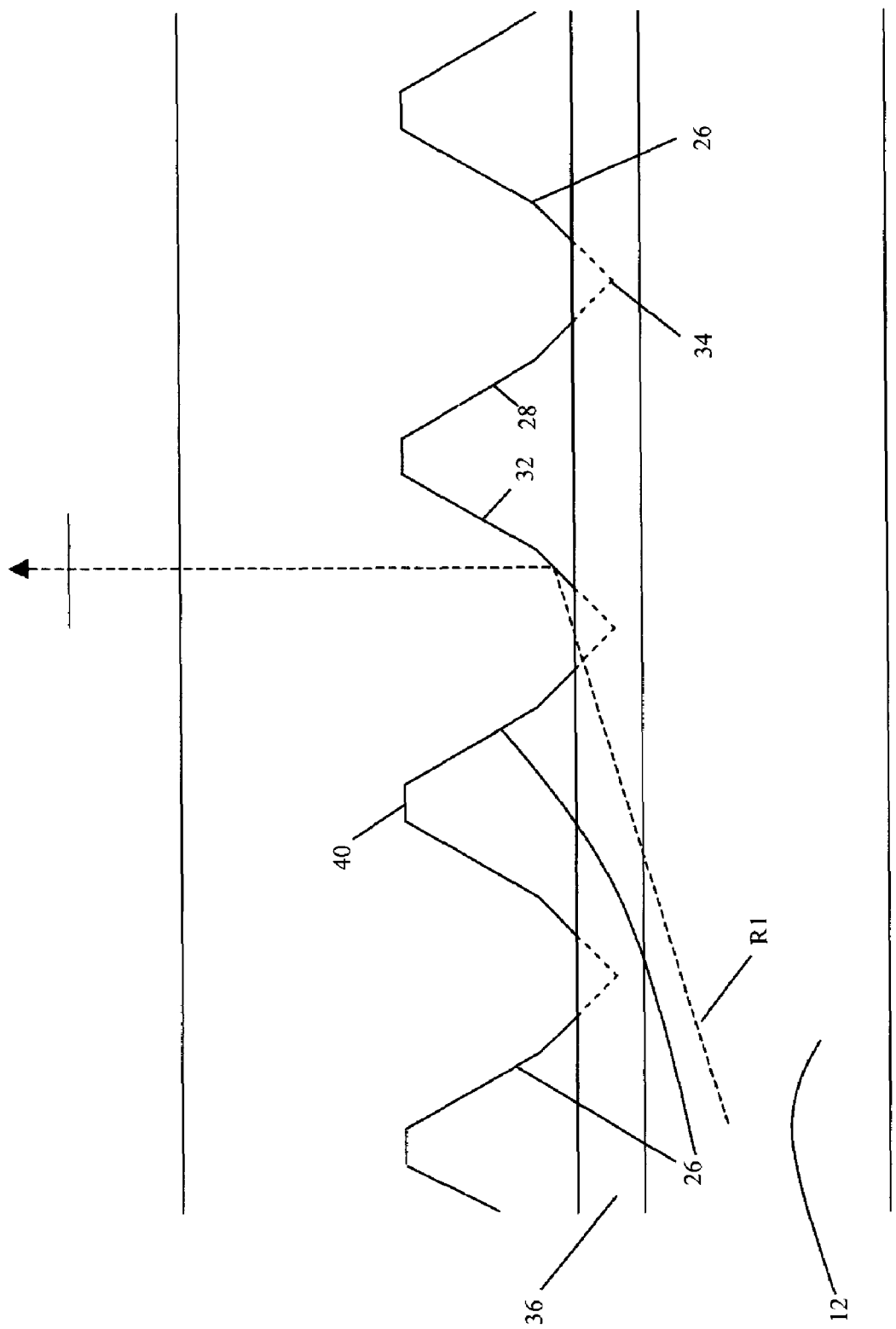
FIG. 5 is a cross-section view of a portion of inventive film showing light handling behavior.

FIG. 5 is a cross-sectional view of light extracting features 26 in an example embodiment, showing typical light trajectories through these features. Ray R1 from light guide 12 is directed through light extracting feature 26. Most of the incident light from light guide 12 is at an oblique angle about a principal ray, as exemplified by ray R1. This light is reflected from sides 28 or 32 by TIR. TIR (for a structure in air) is achieved when the critical angle $\phi_{TIR}$ for incident light is exceeded as defined in equation (2) below, where n is the index of refraction of the material used for light extracting feature 26:

$$\varphi_{TIR} = \sin^{-1}\left(\frac{1}{n}\right) \quad (2)$$

The critical angle $\phi_{TIR}$ is measured relative to normal (that is, perpendicular) to the reflective surface. Typically, planar segments 30a, 30b, 31a, and 31b of light-extracting features 26 are surrounded by air, with an index of refraction of 1.0; alternatively, these may be surrounded by another material with an index of refraction chosen to be relatively small in order to allow TIR on the surfaces of light extracting features 26. As shown in the example of FIG. 5, light entering light extracting feature 26 at an oblique angle is directed toward a more favorable viewing direction. In one embodiment, the light extracting features 26 may substantially cover the entire input surface. In another embodiment, there may be a flat region 40 between adjacent light extracting features 26. Flat region 40 may have varying width in the transverse direction, depending upon the pitch of light extracting features 26 and the angular orientations of their planar segments 30a, 30b, 31a, 31b.

Figure 6:
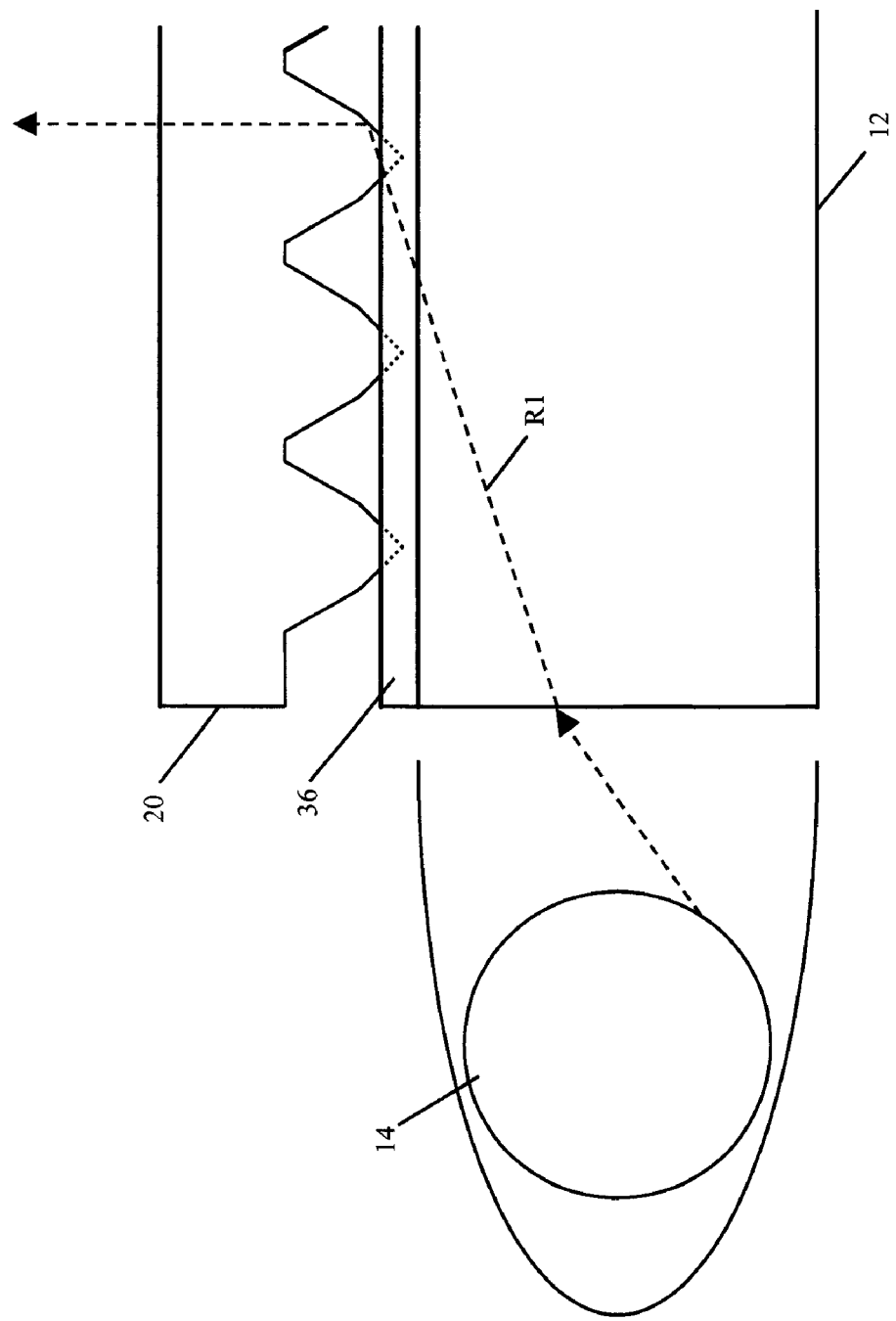
FIG. 6 is a cross-section view showing light travel from the light source through the light guide and light extracting film of the present invention.
Figure 7:
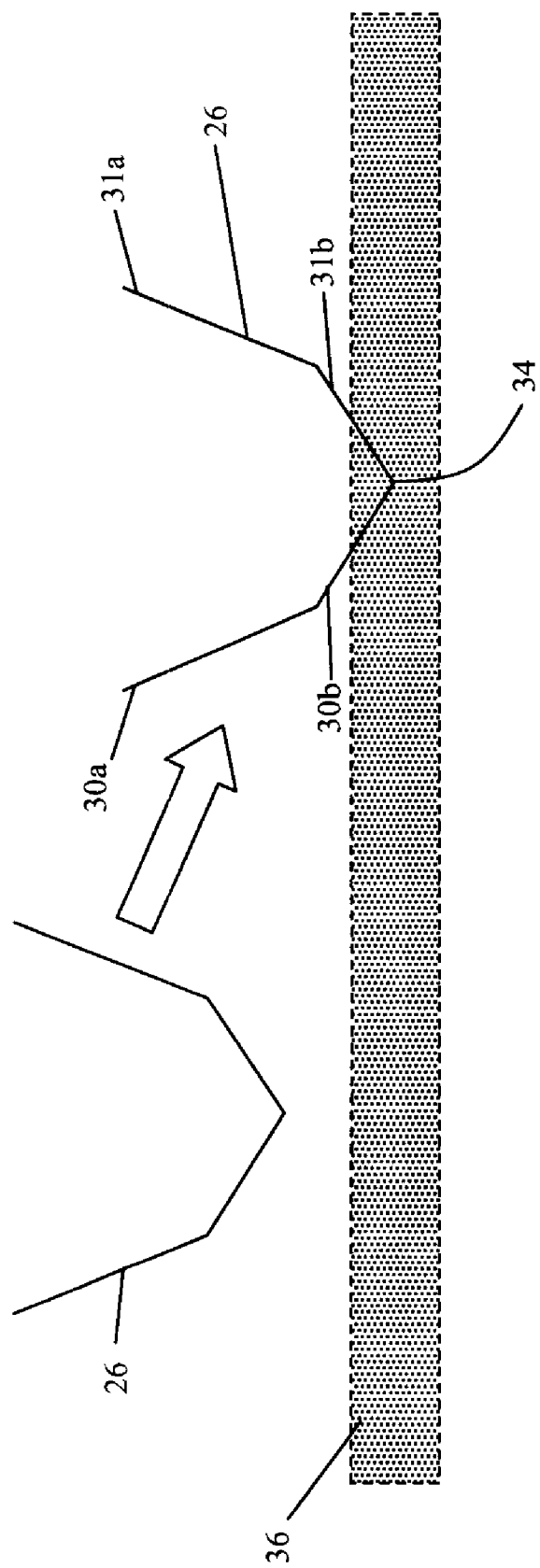
FIG. 7 is a cross-section view of a feature embedded into an adhesive layer.

In order to obtain light from light guide 12, light extracting features 26 must be optically coupled with the surface of light guide 12. Referring to FIG. 6, optical coupling is obtained using a layer of optical adhesive or other bonding agent 36 that has an index of refraction closely matched to the index of refraction n of light guide 12 and light extracting features 26. Use of the layer of optical adhesive 36 is advantageous for optical coupling, helping to compensate for dimensional tolerance errors in fabrication of light extracting features 26 and providing some allowance for varying the surface area for incident light obtained from light guide 12. As shown in FIG. 7, optical adhesive 36 can be applied to some fixed depth for optical coupling of light extracting feature 26. Light extracting feature 26 is partially embedded in the optical adhesive 36 so that optical coupling occurs between light guide 12 and light extracting feature 26. This arrangement is advantageous in manufacturing since, in practice, it can be very challenging to position microstructures on top of a soft material such as optical adhesive 36 with minimal embedment or without embedment at all. Embedment of light extracting features 26 in optical adhesive 36 allows a wide range of mechanical tolerance and is inherently more robust than are complex positioning/placement mechanisms that might otherwise be necessary for proper placement and optical coupling of these structures. With embedment in optical adhesive 36, optical coupling occurs over an area that lies along the tilted planar segments 30b and 31b, closest to apex 34. Thus, unlike conventional solutions such as that proposed in the Beeson et al. '350 disclosure, for example, there is no need to define the light input surface as one particular facet of light extracting feature 26. Instead, the level of embedment in optical adhesive 36 determines the effective area used for receiving light from light guide 12. As a result, the optical contact area can be carefully controlled using the present invention, and precision bonding process is unnecessary, resulting in lower manufacturing costs and higher production yields. It is important to notice that the same tilted planar segments 30b and 31b are also used to direct incident light using total internal reflection. In many cases, light reflected from the tilted planar segment 30b and 31b is not incident on the planar segments 30a and 31a.

Optical adhesives have been used with earlier light extraction articles, such as that described in the '675 Onishi et al. patent, for example. However, as pointed out in the '675 Onishi et al. disclosure, the conventional approach teaches that embedment of light extracting structures in an optical adhesive is to be avoided where possible. In conventional practice, the optical adhesive is employed as a bonding agent only, without actively employing the adhesive material at the optical interface. Thus, for example, a type of surface lamination has been used to bond various types of microstructures to a light guiding plate, without embedment of the structures in the adhesive layer. The present invention, on the other hand, uses a controllable amount of embedment within the optical adhesive layer as a mechanism for achieving a needed level of optical coupling. This also helps to increase the contact area between adhesive and microstructures, resulting in an improved bond to light guide 12.

Figure 8A:
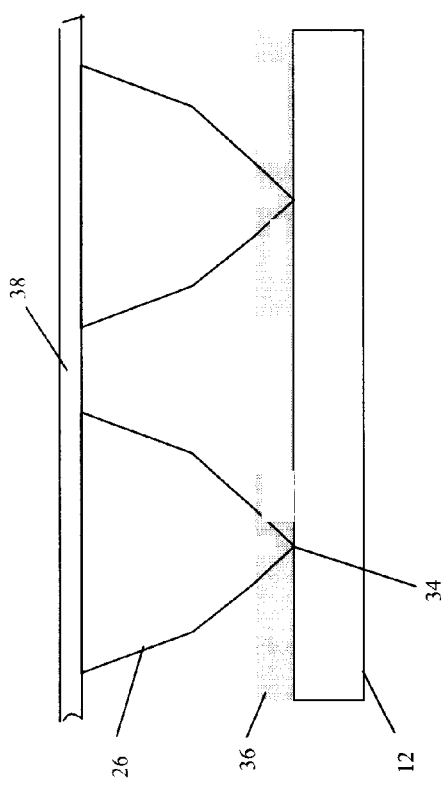
FIG. 8A is a cross-section view of a feature embedded into an adhesive layer and registered against the light guide.

As shown in the example of FIG. 8A, apex 34 may lie directly against the surface of light guide 12, registered against light guide 12 in this way, with the layer of optical adhesive 36 used to hold light extracting features 26 in place and to provide a suitably sized input aperture for light extracting features 26. In one embodiment, light extracting features 26 are embedded within optical adhesive 36 to a depth of about 9 micrometers.

Figure 8B:
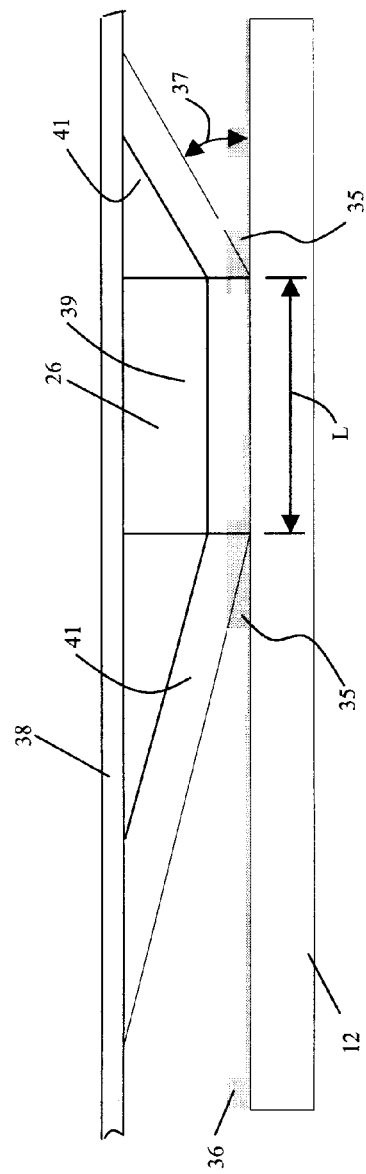
FIG. 8B is a side view of a feature embedded into an adhesive layer and registered against the light guide.

As shown in the side view example of FIG. 8B, the ends 41 of the light extracting features 26 may be sloped at a slope angle 37. In this case, the length L of the light extracting feature 26 is the length of its central portion 39, where optical coupling occurs. The ends 41 may have different slope angles 37 or the ends 41 may be curved. The optical adhesive 36 may embed a portion of the sloped ends 41, resulting in some optical coupling in regions 35 outside the region where apex 34 contacts the light guide 12. The sloped ends 41 of neighboring light extracting features 26 may intersect.

Figure 9:
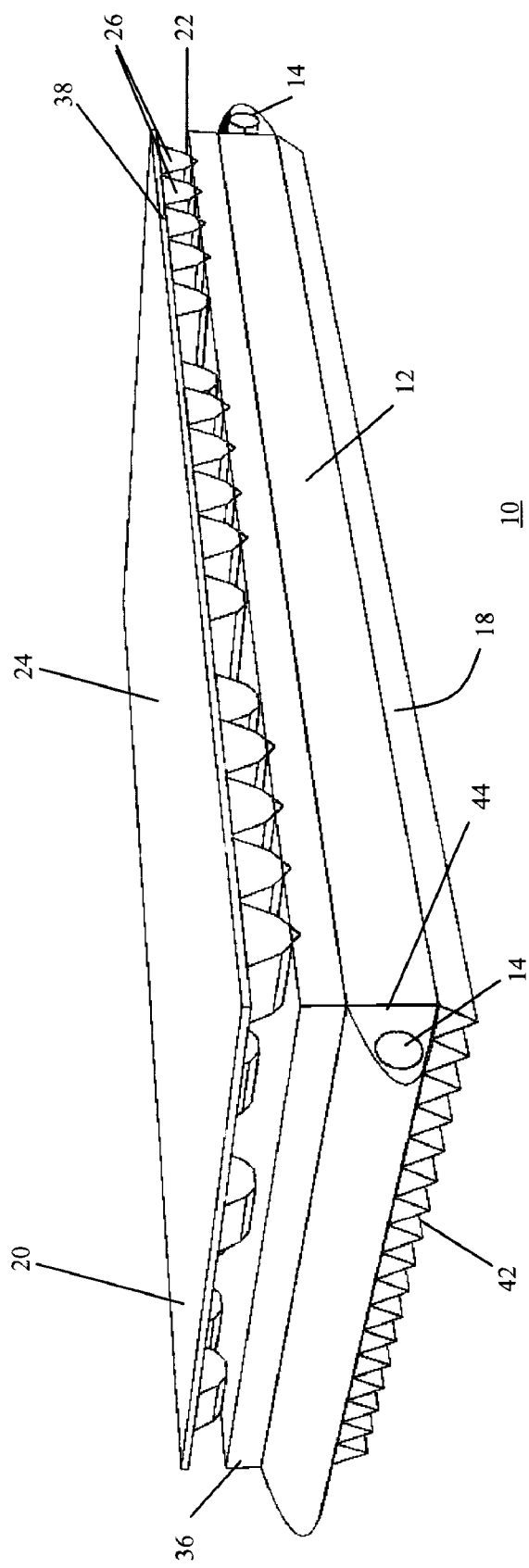
FIG. 9 is a perspective view of an illumination apparatus using the film of the present invention.
Figure 10:
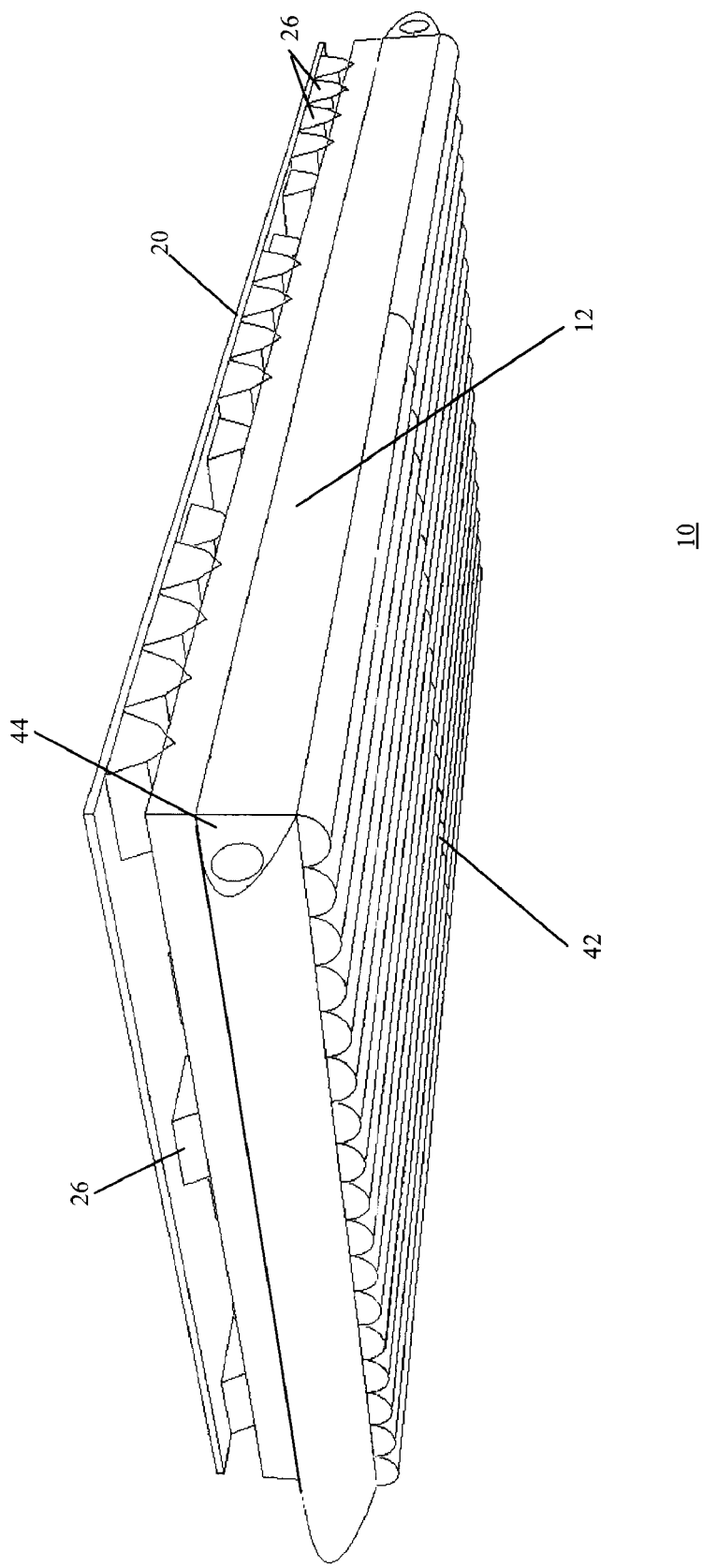
FIG. 10 is a perspective view, from the bottom side, of an illumination apparatus using the film of the present invention.
Figure 11:
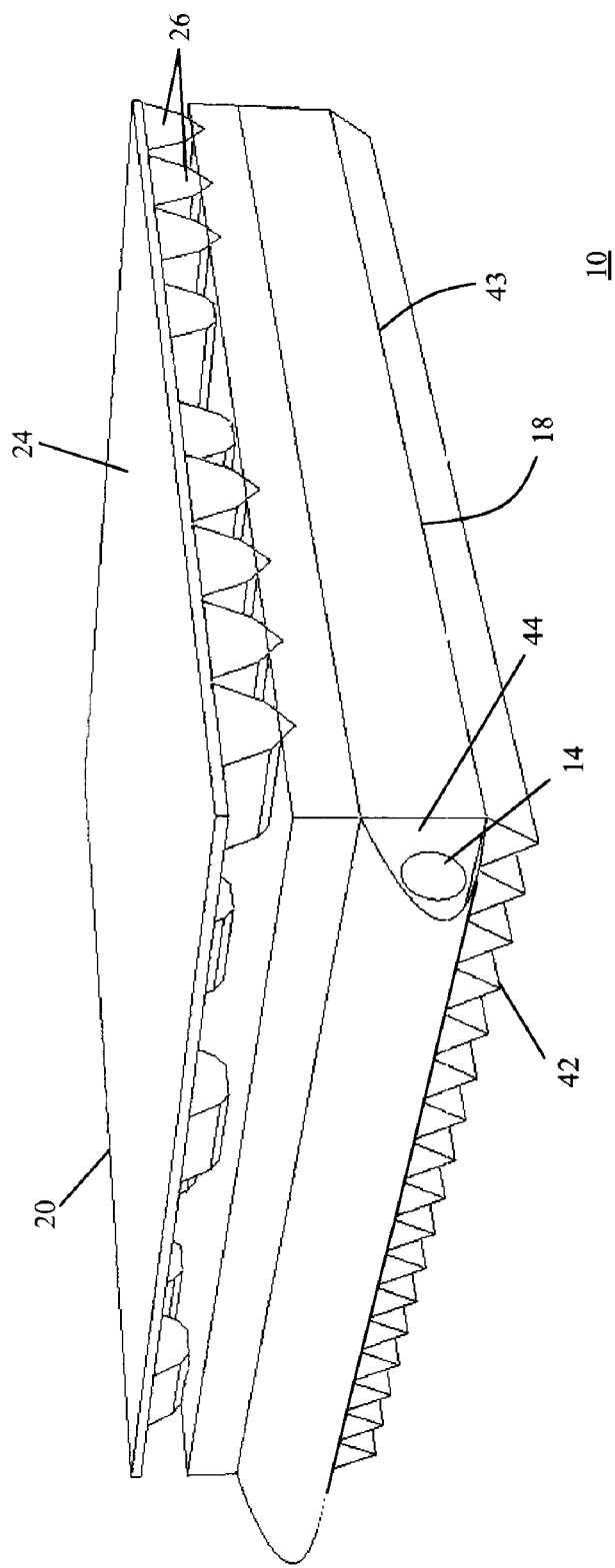
FIG. 11 is a perspective view of an illumination apparatus using the film of the present invention.

FIGS. 9 through 11 show perspective views from various angles of film 20 used as part of illumination apparatus 10. In these and other figures of the present disclosure, the light extracting features 26 are shown without sloped ends 41. In order to control beam divergence in the direction normal to the plane of output surface 24, a bottom micro-structured layer 42 may be used. In a specific embodiment described herein, the bottom micro-structured layer 42 includes a plurality of prism-shaped elements that reduce beam angle by total internal reflection (TIR) in a direction normal to the plane of output surface 24 and thus more efficiently enhance brightness within a predetermined viewing angle. The bottom micro-structured layer 42 may form the bottom surface 18 of the light guide 12 as shown in FIG. 9, or it may be disposed next to the bottom surface 18 of the light guide 12 and optically coupled to the light guide 12, for example with optical adhesive 43 as shown in FIG. 11. Depending on the viewing angle requirement, the apex angle of the prismatic structure on bottom micro-structured layer 42 is in the range of approximately 20.0 degrees to approximately 170 degrees. Illustratively, the pitch of the prismatic structure is in the range of approximately 10.0 micrometers to approximately 1.0 millimeter. In specific embodiments, the pitch is in the range of approximately 25.0 micrometers to approximately 200 micrometers.

Notably, bottom micro-structured layer 42 may include features that are other than prism-shaped. For example, the micro-structured layer may have features that are arcuate, semi-circular, conic, aspherical, trapezoidal, or composite of at least two shapes in cross-section. The pitch of each shape is in the range of approximately 10.0 micrometers to approximately 1.0 millimeter; and in specific embodiments the pitch is in the range of approximately 25.0 micrometers to approximately 200.0 micrometers.

In general, the features of micro-structured layer 42 are elongated in shape in a direction perpendicular to light accepting surface 44 on light guide 12. The size and shape of features can be varied along this direction, and in one embodiment at least one of the microstructures has a finite length that is less than the length of the light guide along the longitudinal direction. For example, the apex angle of a prismatic shape may be approximately 90.0 degrees near light accepting surface 44 and approximately 140.0 degrees farther away from the light source (i.e. toward the central portion of light guide 12). The features of the micro-structured layer 42 can be continuous or discrete, and they can be randomly disposed, staggered, or overlapped with each other. Finally, a bottom reflector that is planar or has a patterned relief may be disposed beneath light guide 12 or micro-structured layer 42 in order to further enhance brightness by reflecting back to the display light that has been reflected or recycled from display or backlight structures.

As detailed herein, light extracting features 26 of film 20 are disposed to provide an increased luminance to display and lighting surfaces. Moreover, the light provided to the display and lighting surfaces is more uniformly distributed over the surfaces. The combined effect is an increased luminance and a greater uniformity of light in display and lighting applications. In addition, the ill-effects of interference patterns such as Moiré patterns are substantially mitigated through the structures of the example embodiments.

FIG. 9 shows an embodiment having two light sources 14. FIG. 10 is a perspective view of illumination apparatus 10 in accordance with an example embodiment. The illumination apparatus 10 includes light extracting features 26 described previously. In addition, illumination apparatus 10 includes the micro-structured layer 42 having features that are semi-circular in cross-section in this embodiment. FIG. 11 shows an embodiment having one light source 14.

Figure 12:
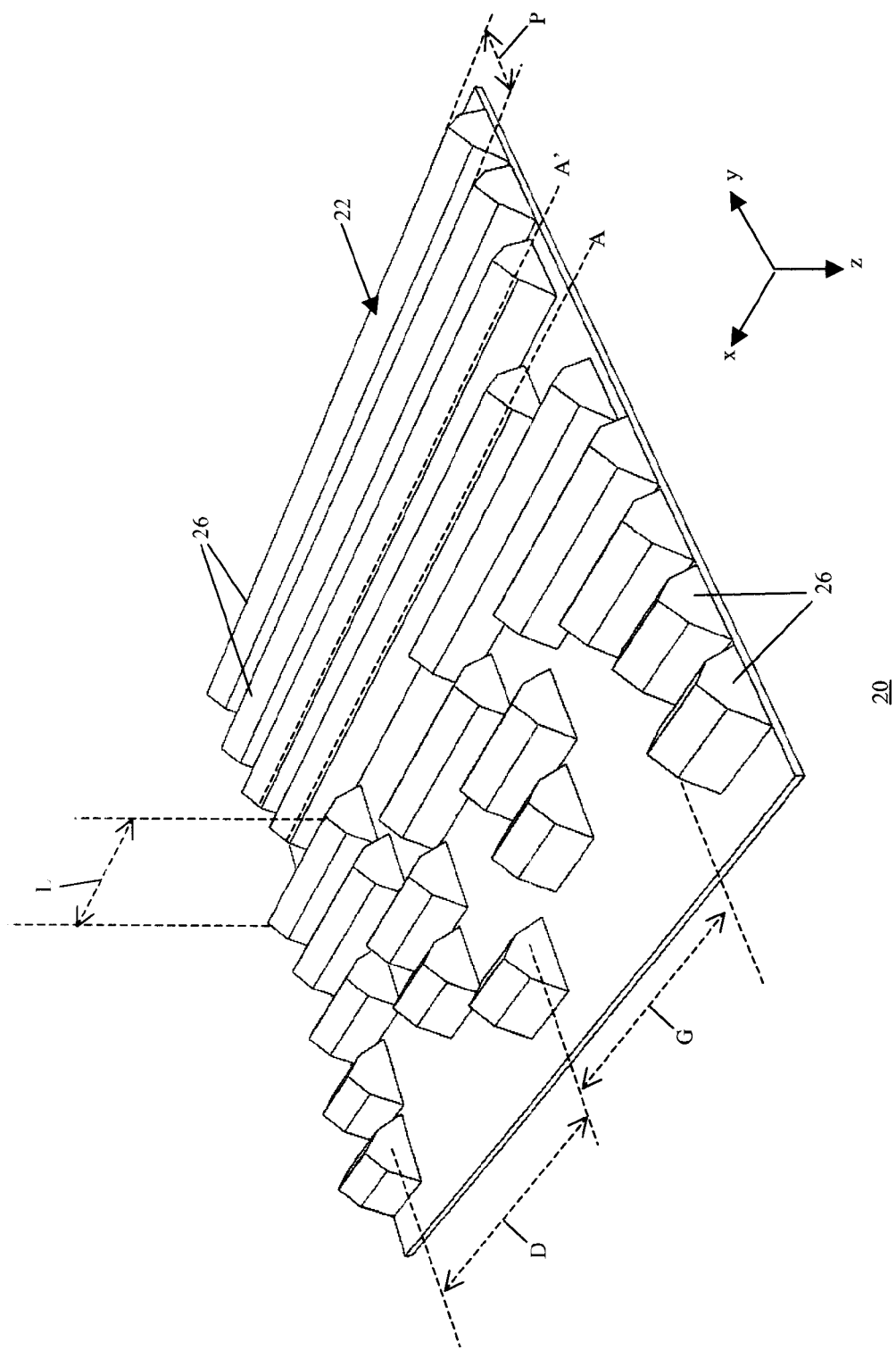
FIG. 12 is a perspective view, from the light input side, of a film in one embodiment.
Figure 13:
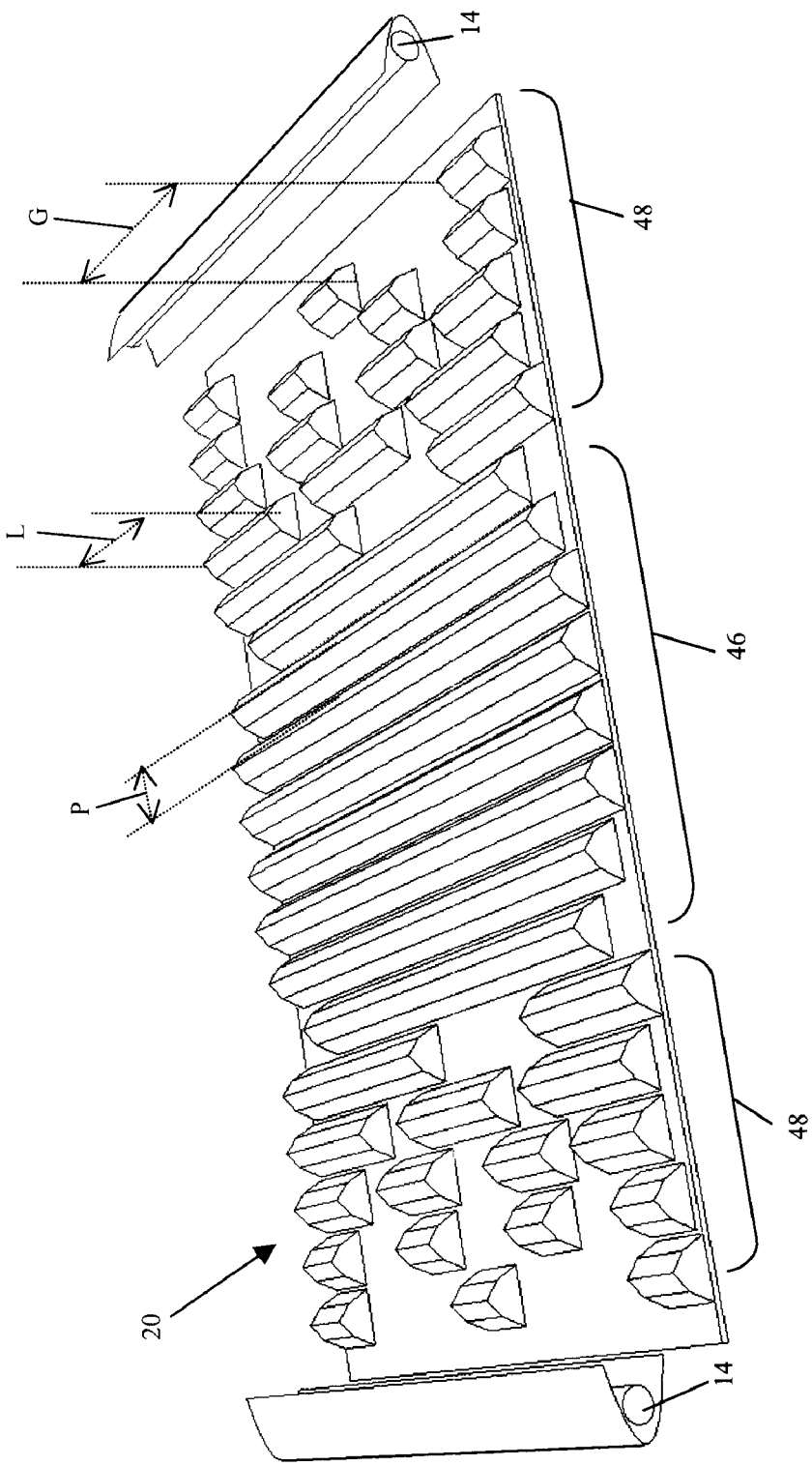
FIG. 13 is a perspective view, from the light input side, of a film with light sources in one embodiment.

FIGS. 12 and 13 show perspective views of light extracting film 20 as seen from the input side, with light guide 12 removed for clarity. Each light extracting feature 26 has a length L. Light extracting features 26 may be separated by lengthwise gaps G, where there would be no optical coupling with light guide 12, allowing for a variable lengthwise distribution of light. In the width direction, the pitch P between light extracting features 26 may be substantially constant or may be varied to change the light distribution by changing the amount of optical coupling with light guide 12. Adjacent light extracting features 26 are generally in parallel, so that longitudinal axes A and A' are substantially in parallel with each other and also in parallel with the plane of input surface 22. Consistent with the coordinate axes of FIG. 12, the length L is along the x-axis, the pitch P along the y-axis. Notably, the z-axis is directed toward the viewer of the display (not shown). Each light extracting feature 26 has a cross-sectional shape in the yz-plane and the cross-sectional shape is substantially constant along the length of the feature.

As is shown in the perspective view of FIG. 13, light extracting features 26 can be distributed differently over different portions of light extracting film 20. In the example of FIG. 13, a central portion 46 of light extracting film 20 has light extracting features 26 that are close together with respect to pitch P and have few or no gaps G. By comparison, end portions 48 have a number of gaps G that can be of varying dimensions and may also have larger values for pitch P. With such an arrangement, the amount of optical coupling over central portion 46 would be greater than the amount of optical coupling over end portion 48. Thus, the capability for light coupling over central portion 46 would be higher than at either end portion 48.

As shown in FIG. 13, light sources 14 are typically positioned nearest one or more edges of light guide 12. As a result, in many display and lighting applications, the amount of light extracted at the regions near light sources 14 is greater than, for example, that extracted nearer the center of the light guide. As can be readily appreciated, this can result in brightness nonuniformities across the display or lighting surface.

In the present example embodiment of FIG. 13, the length L of light extracting features 26 is selected to provide a suitable amount of optical coupling with the light guide 12 relative to their location on light extracting film 20. As a general principle, the optical contact area in a region of light extracting film 20 is the area of optical coupling between light extracting features 26 and light guide 12 in the region. The optical contact ratio over a portion of light extracting film 20 can be expressed as the ratio of the optical contact area in that portion to the total area of the light guide 12 surface in the portion. With reference to FIG. 13, for example, in end portions 48, near light sources 14, the length of light extracting features 26 is relatively small and gaps are distributed. Thus, because this translates directly into a smaller optical contact ratio of light extracting features 26 with light guide 12, the optical contact area per unit area of light extracting film 20 is less in end portions 48 than over central portion 46. The lower the optical contact ratio between light extracting features 26 and light guide 12 in a certain area, the lower the amount of light (flux) that will be extracted from the light guide in this area.

In accordance with example embodiments, light from light sources 14, which is normally most intense near end portions 48, is purposely extracted to a lesser extent in these portions; and light in central portion 46, which is normally less intense compared to end portions 48, is purposely extracted to a greater extent in this portion. Overall, this fosters a more uniform extracted light distribution compared to known light-extracting structures.

As will be apparent to those skilled in the art, this same approach may also be applied to achieve desired non-uniform light distributions. In this case, the optical contact area is increased further in regions where higher than average brightness is desired and the optical contact area is decreased further in regions where lower than average brightness is desired.

This principle can be used to increase the local uniformity of light in certain regions of light extracting film 20. For instance, in many display applications, there can be dark regions in the corners of the display. In this case, the light flux in the light guide varies in the x-direction, parallel to the light source. As such, for one reason or another, even though the corners translate to portions of light guide 12 near light sources 14, there can be less light extracted from the light guide at these portions. In keeping with the example embodiments, the intensity of the light at the corners may be increased and the uniformity of the light distribution improved by increasing the optical contact area of light extracting features 26 in corner regions of light extracting film 20. Similarly, if a region of a display or lighting device has a local brightness, the uniformity can be improved by reducing the optical contact area at the corresponding portion of light extracting film 20. In the former case, the features may be made longer and in the latter the features may be made shorter in order to increase and decrease, respectively, the optical contact area in the pertinent portion of light extracting film 20.

In general, the light flux in light guide 12 will require a given amount of optical contact area at each location on light extracting film 20, where the optical contact area is calculated over a comparatively small 'neighborhood' of light extracting film 20 around each location. The neighborhood must be small enough to avoid visible non-uniformity of brightness to the viewer of the display. The neighborhood must also be small enough to support variation in brightness across light extracting film 20 without brightness transitions between neighborhoods that are visible to the viewer of the display. As a result, the size of the neighborhood will depend on the application, and depends on pixel size of the LCD display, diffusing power of layers to be placed between light extracting film 20 and the LC panel, expected distance from the display to the viewer, and other application-specific factors. The size of a neighborhood might be considerably less than the size of a small LC panel pixel or might be as large as approximately 1.0 millimeter or more in larger display applications.

In example embodiments, the first pitch P is substantially the same across light extracting film 20. The first pitch P is illustratively between approximately 10.0 micrometers and approximately 300.0 micrometers depending on the type of display and is chosen in order to mitigate the ill-effects of interference patterns such as Moiré interference in lighting and display applications. Moiré patterns become visible when two periodic or partially-periodic patterns are superimposed on each other. The period of Moiré patterns is calculated as follows:

$$p_M = \left( \left| \frac{n}{p_1} - \frac{m}{p_2} \right| \right)^{-1} \quad (3)$$

where $p_1$ and $p_2$ are pitches of two periodic patterns and $p_M$ is the period of the resulting Moiré pattern when the two patterns are superimposed. The n and m are positive integer numbers. Generally speaking, Moiré patterns are not visible for cases when n or m is greater than or equal to 4. This means that a human eye usually cannot perceive Moiré patterns if one of the two pitches becomes smaller than one fourth of the other pitch. Depending on other details of the two periodic patterns, in many cases when one pitch $p_1$ is known, another pitch $p_2$ can be chosen such that substantially all of the resulting Moiré patterns are of sufficiently low contrast, or sufficiently high or low frequency, that they are not visible to the human eye or they can be hidden using a diffusing sheet or other means added to the display.

The diffusing sheet can be any type of diffusing sheet that provides the necessary optics to prevent the visibility of Moiré patterns, or defects in the preceding film or light guide. Typically, the diffuser is either a volume diffuser or a sheet diffuser. Alternatively, the diffusing functionality can be integrated into the light extracting film. This can be accomplished by a surface coating the on the output surface of the film. In a preferred embodiment, the light extracting features can be formed directly on to a diffusing sheet.

Known light extracting layers include a varying y-direction pitch along the y-direction of the layer, using the coordinate system of FIG. 12. Varying the pitch provides variance in the optical contact ratio. However, the varying pitch in these known structures can cause objectionable Moiré patterns in the display. As these fringes degrade the image quality of the display or the light pattern of a lighting device, they are beneficially avoided or mitigated to the extent possible. Furthermore, varying the pitch in the y-direction can only compensate for y-direction variability in the light flux in the light guide, and cannot compensate for x-direction variability in the light flux in the light guide.

In order to prevent or at least significantly reduce Moiré fringes, in example embodiments the first pitch P is selected and maintained substantially constant across light extracting film 20. This may be done by choosing the pitch P smaller than approximately 0.25 times the pitch of LC panel in the corresponding direction or by choosing pitch P in other ways such that all interference patterns are not visible to the human eye.

In other example embodiments, the first pitch P may be variable across light extracting film 20 in order to substantially avoid objectionable Moiré patterns. For example, the positions of the light extracting features 26 in the y-direction may be randomly perturbed in the y-direction while maintaining the desired optical contact ratio within each small neighborhood on light extracting film 20. To substantially reduce Moiré interference, it is desirable to randomly perturb the positions of the light extracting features by at least 5% of their pitch. (As used herein, the term "random" means random or pseudo-random as generated by computer algorithms or other methods known in the art.)

With reference to FIG. 12, the second pitch D is the distance in the x-direction from the same point on two neighboring light extracting features 26. The second pitch D is also selected to significantly reduce, if not prevent Moiré effects. The second pitch D is chosen with respect to the pitch of periodic structures in the LC panel or other display components in the corresponding x-direction.

In a specific embodiment, the second pitch D is substantially constant and is selected in a manner described in connection with the selection of the first pitch P. In such embodiments, the length of the light extracting features 26 may be varied to achieve the desired optical contact area in each neighborhood. If it is not feasible to fabricate the light extracting features 26 small enough to achieve the desired optical contact area in any neighborhood, then some of the light extracting features 26 may be omitted entirely. The light extracting features 26 that are omitted may be in a carefully chosen pattern (such as every other one, every third one, or in a 'checkerboard' pattern), or they may be omitted in a randomly chosen pattern, so long as the optical contact area in each small neighborhood is preserved. Methods known in the art may be used to determine the length of features and which features are omitted. These methods include dithering techniques such as half-toning, Floyd-Steinberg dithering, and partially-random dithering methods.

In another example embodiment, the lengths of the light extracting features 26 may be constant and the second pitch D varied to achieve the desired optical contact area. In this case, the x positions, and resulting pitches, of the features may be randomly perturbed to lessen Moiré effects.

In other example embodiments, the length of light extracting feature 26 and the second pitch D are both varied while maintaining the desired optical contact ratio within each neighborhood. For purposes of illustration, consider the area of light extracting film 20 divided into rows. Further suppose the desired optical contact ratio in a neighborhood requires that 60% of a row in the x-direction consist of light extracting feature 26, with 40% 'empty' space between features. This could be achieved by light extracting features 26 that are 60 micrometers long and spaces that are 40 micrometers long (i.e., second pitch D of 100 micrometers), or light extracting features 26 that are 90 micrometers long and spaces that are 60 micrometers long (for a second pitch D of 150 micrometers), or any other combination that maintains the approximately 60:40 ratio between feature lengths and spaces. A row may have light extracting feature 26 and spaces therebetween of several sizes, where the average over the neighborhood achieves substantially the desired optical contact ratio. The feature positions, lengths, and spaces may follow a pattern designed to minimize Moiré interference effects; or may be chosen randomly from a range of possible values such that the desired optical contact ratio is achieved.

In still other example embodiments, first pitch P and second pitch D may both be varied across light extracting film 20 in ways that avoid or minimize Moiré effects. One example of placing light extracting features 26 in these embodiments, as will be appreciated by one skilled in the art, is analogous to the placement of backlight dots as described in Journal of the Optical Society of America A, Vol. 20, No. 2, February 2003, pp. 248-255, to Ide, et al., the disclosure of which is specifically incorporated herein by reference. With this method, the locations of light extracting features 26 are determined by combinations of known methods such as random placement, low-discrepancy sequences, and dynamic relaxation. Additional similar methods will be appreciated by those skilled in the art. As applied to the present embodiment, such methods result in non-periodic yet varying-pitch patterns that achieve the desired optical contact ratio within each small neighborhood of light extracting film 20 and simultaneously avoid or minimize Moiré patterns.

The methods used to distribute light extracting features 26 over the surface of light extracting film 20, the choices of first and second pitches, and related methods of varying the optical contact area described above may be combined in embodiments. The method chosen will depend on the particular application domain and details.

Figure 14:
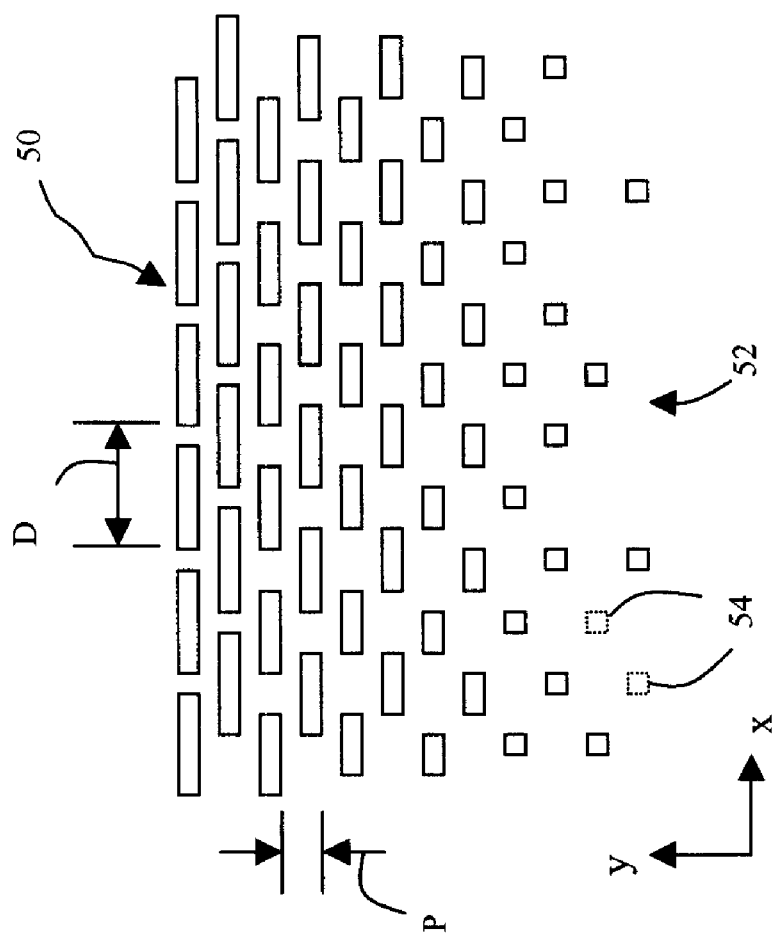
FIG. 14 is a top schematic view of a film having an optical contact ratio varying across the film in accordance with an example embodiment.

FIG. 14 illustrates the optical contact area of the light extracting features 26 of a light extracting film 20 in accordance with an example embodiment. In the present embodiment, the first pitch P in the y-direction and the second pitch D in the x-direction are both constant across light extracting film 20. The lengths of the light extracting features 26 are increased in an upper region 50 to increase optical contact area, and the lengths of light extracting features 26 are decreased in a lower region 52 to decrease optical contact area. At lower region 52, some features (shown as dotted line features 54) have been omitted entirely to further decrease optical contact area in that region.

Figure 15:
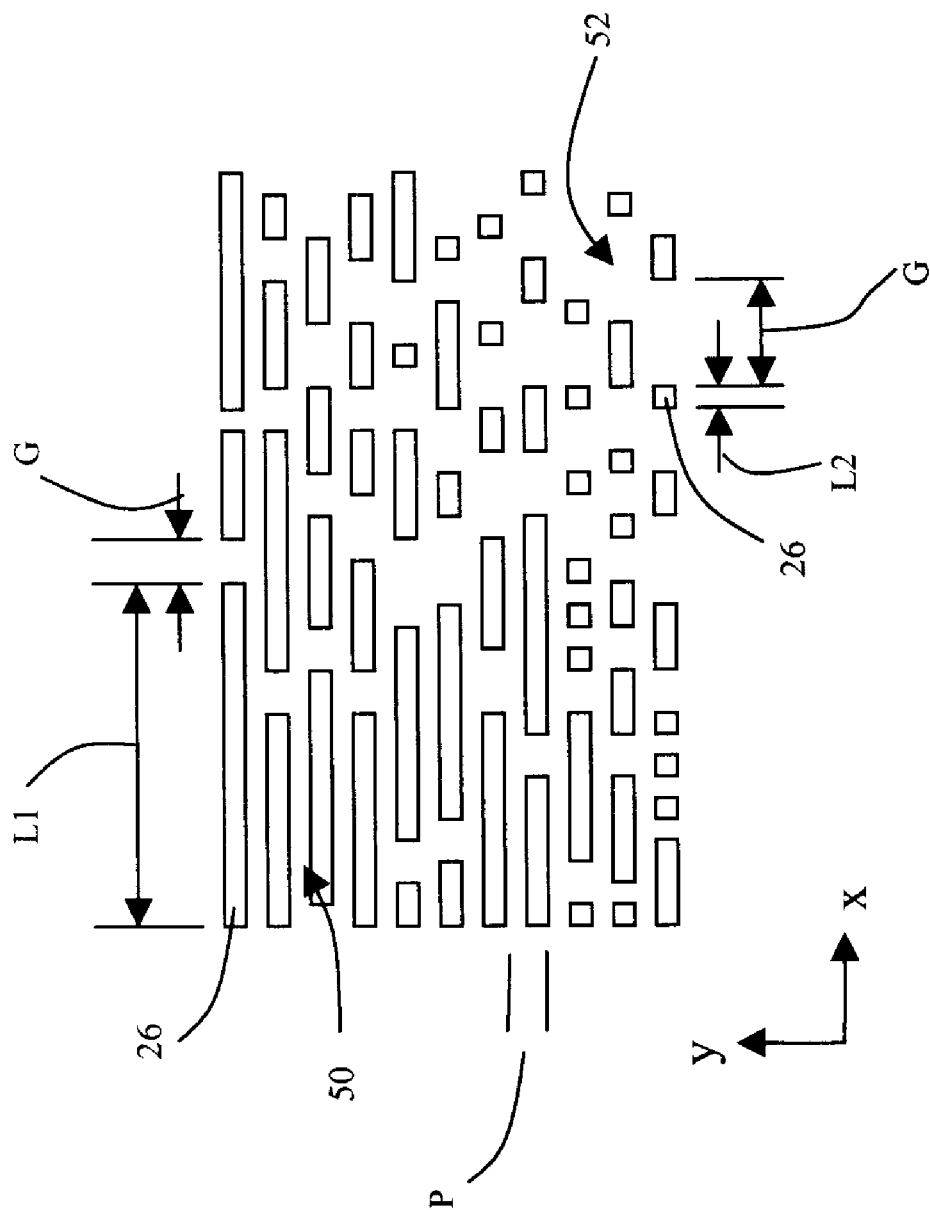
FIG. 15 is a top schematic view of a film where the optical contact ratio varies across the film in accordance with another example embodiment.

FIG. 15 illustrates another example embodiment. In this embodiment the first pitch P in the y-direction is chosen to be constant and less than approximately one-fourth of the LC panel pixel pitch in the corresponding direction to avoid Moiré, while the second pitch D in the x-direction is varied randomly together with the feature lengths L1, L2, and gaps G to achieve the desired optical contact area in each neighborhood of light extracting film 20. The optical contact area is greater in upper region 50 of the illustrated area of light extracting film 20, and the optical contact area is comparatively smaller in lower region 52. Notably, the optical contact ratio in this example embodiment varies in both the x-direction and the y-direction. In upper region 50, the feature lengths L1 are generally greater and gaps G between features are generally smaller. In lower region 52, the feature lengths L2 are generally smaller and the gaps G between features are generally larger.

Notably, the optical contact area can be tailored to extract light from the light guide 12 by forming the light extracting features 26 as discrete or discontinuous elements, having a substantially constant pitch (in the y-direction of FIG. 12) that is selected to avoid creating a visible Moiré pattern. Moreover, as described previously, the light extracting features 26 are distributed so as to avoid Moiré patterns in the direction of their length (x-direction).

Figure 16:
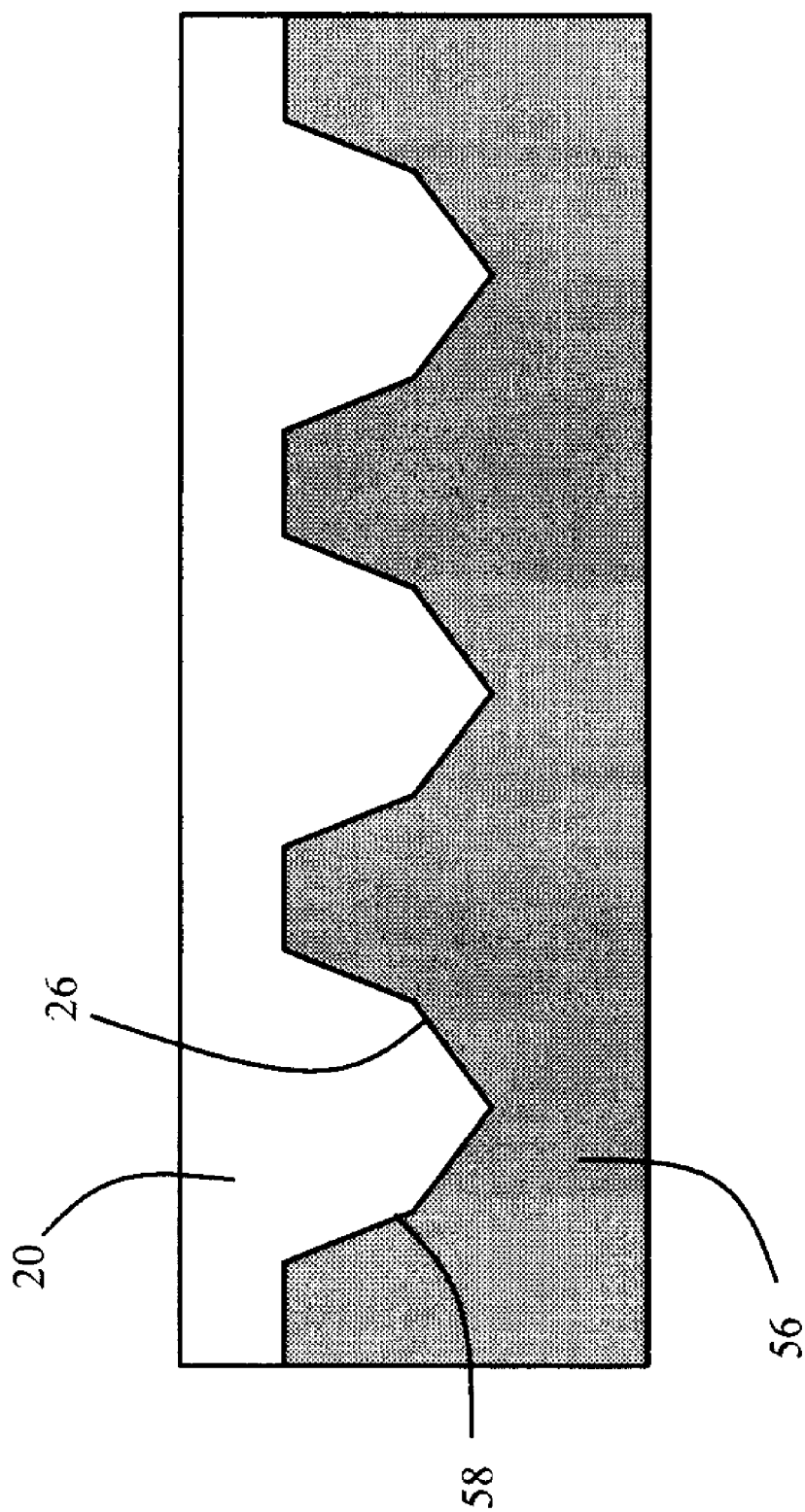
FIG. 16 is a cross-sectional view of a film being replicated from a mold in accordance with an example embodiment.

Light extracting film 20 according to the example embodiments may be fabricated using a variety of known methods, generally involving replication from a mold. FIG. 16 shows a cross-section of a light extracting film 20 being replicated from a mold 56. Mold 56 may be made of materials such as copper, aluminum, nickel and other standard mold materials and alloys thereof, capable of holding optical-quality surfaces and of withstanding the stresses induced by the intended molding processes. Mold cavities 58 ('cavities') in the mold are the negative shape of the light extracting features 26 that are formed.

In one embodiment, mold 56 may be planar and light extracting film 20 is formed by injection molding. In another embodiment, light extracting film 20 is formed as a film in a roll-to-roll process using a mold in roller form. Suitable forming processes will be known to those skilled in the art, including but not limited to solvent or heat embossing, UV casting, or extrusion-roll molding as disclosed in U.S. Pat. No. 6,583,936, the disclosure of which is specifically incorporated herein by reference. After the continuous film is formed in a roll-to-roll process, then the individual sections of light extracting film 20 may be cut from the film. If the optical contact ratio of light extracting film 20 only varies along the y-direction, then the roller for light extracting film 20 may be made with one or more continuous bands around the roller, and the individual sections may be cut from film that is molded from any circumferential position around the roller. However, if the optical contact ratio of light extracting film 20 varies along the x-direction as well, for example to compensate for dark corners in the light guide, then the roller will have one or more rectangular images of light extracting film 20 on it, and the individual sections of light extracting film 20 must be cut from the corresponding locations on the film. The roller might have images of one or more different light extracting film 20 designs for multiple applications.

A roller for molding light extracting film 20 may be fabricated using a gravure-type engraving process, or by a digitally controlled fast-servo diamond turning machine, or similar technology. For example, gravure-type engraving may be effected in accordance with commonly assigned U.S. patent application Ser. No. 10/859,652 entitled "Method for Making Tools for Microreplication" to Thomas Wright, et al. The disclosure of this application is specifically incorporated herein by reference. In these processes, a blank roller is mounted in a cutting machine, and the roller is turned about its axis. A cutting head moves a cutter into and out of the surface of the roller as the roller turns. The cutting edges of the cutter determine the cross section of the mold cavity. The tip of the cutter typically follows a path that is substantially contained in a plane, and in example embodiments the plane containing the cutter path is not perpendicular to the roller surface.

In the coordinate system of FIG. 12, the turning of the roller creates the lengthwise (x) direction of the cavities. The timing of moving the cutter into the surface determines the x starting position of each cavity, and the length of time the cutter is left in the roller determines the length of that cavity. After cutting cavities at a particular axial position on the roller (corresponding to the y-direction location of the features), the cutting head is moved to a new axial position to cut additional cavities. By repeating this process across the roller, a roller may be fabricated to produce light extracting film 20 in a roll-to-roll replication process.

Figure 17B:
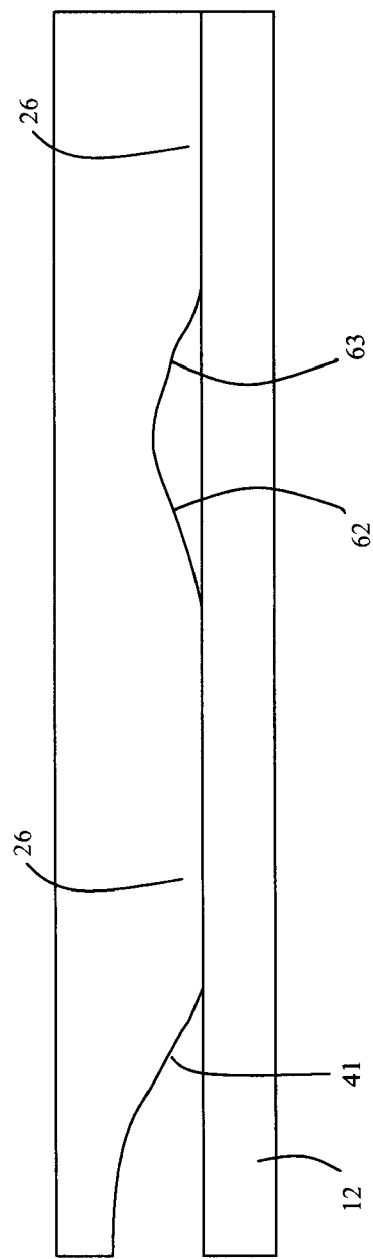
FIGS. 17A and 17B are cross-sectional views of a film as it might be fabricated from a mold created with an example fabrication process in accordance with an example embodiment.
Figure 17A:
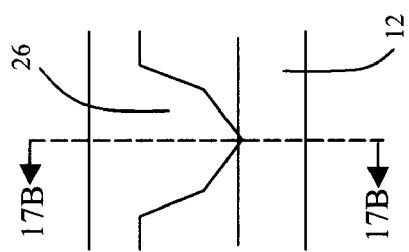

FIG. 17A illustrates a cross-section of a single light extracting feature 26 in contact with light guide 12. FIG. 17B shows a cross-section of the same light extracting feature 26 along the line indicated 17B-17B in the x-z plane of light extracting film 20, again using the coordinate system of FIG. 12. In creating a roller or mold 56 for light extracting film 20, a cutting tool typically cannot enter or exit the roller surface instantly. As the roller turns, the cutter enters the roller surface, resulting in a sloped end on the roller cavity 58 and a corresponding sloped end 41 on light extracting feature 26 as well. Typical cavity and light extracting feature end slopes range from approximately 5 degrees to approximately 25 degrees measured from the uncut roller surface. The cutting tool may be able to exit the roller surface more quickly than it enters, or vice versa, resulting in different slopes on two sloped ends 61, 62. In some cases, when light extracting features 26 are spaced closely in the x-direction, the sloped ends 62, 63 may intersect where the cutting tool does not exit the roller surface completely between cavities 58. This is acceptable for light extracting film 20 because light extracting features 26 do not need to be fully interrupted, but only need to be small enough that they no longer contact or are laminated to light guide 12, thus avoiding optical contact and keeping light from being extracted.

Figure 18:
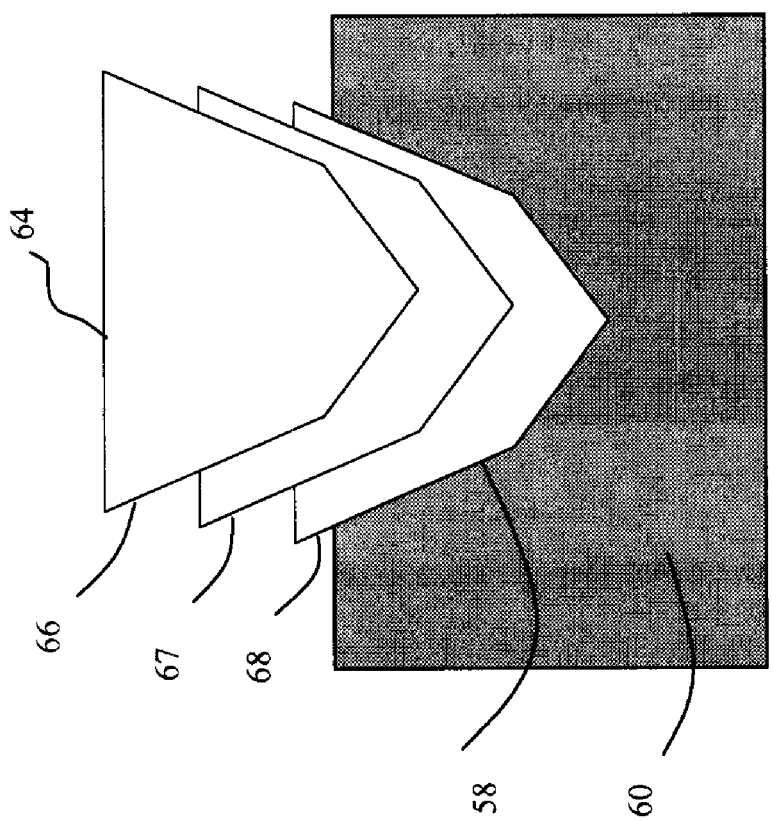
FIG. 18 is a cross-sectional view of a diamond cutter fabricating a mold in multiple cuts in accordance with an example embodiment.

The roller cavities might be cut using single or multiple cuts to achieve the final shape on the roller. FIG. 18 shows a cross-sectional view of a cutter 64 cutting a mold cavity 58 in a roller surface 60 in three cuts. In this example, the cutter cross-section is shaped as shown, resulting in mold cavities and light extracting features 26 with the same shape. During one pass on roller surface 60, cutter 64 only plunges to the level shown in position 66 against roller surface 60. During later passes across roller surface 60, cutter 64 plunges to the next two positions 67 and 68, with the final position 68 cutting mold cavity 58 to its final shape.

Figure 19B:
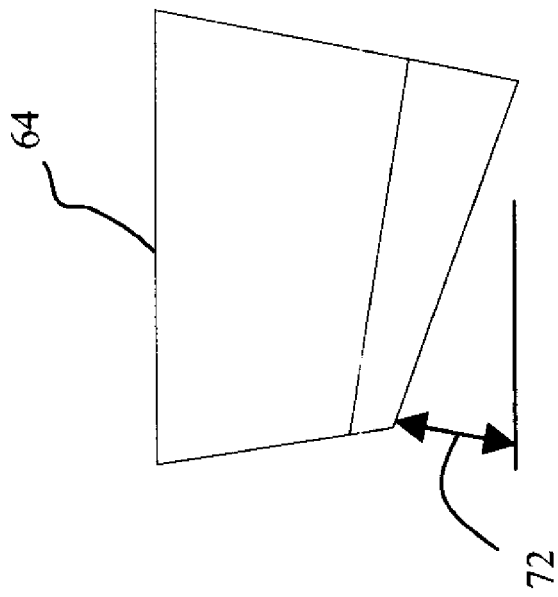
FIGS. 19A and 19B are cross-sectional views of a diamond cutter that might be used to fabricate a mold in accordance with an example embodiment.
Figure 19A:
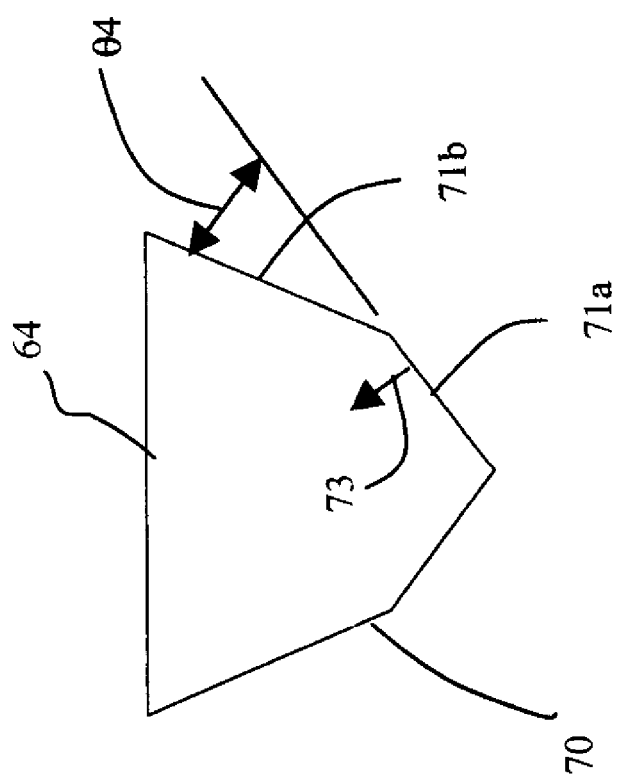

In the noted roller-cutting processes, diamond cutting tools are beneficial because of their ability to form an optical-quality cut surface finish and their resistance to wear, chipping, and other types of cutter damage. FIG. 19A shows a front view of the tip 70 of a diamond cutter 64, and FIG. 19B shows a side view of the same cutter. The cutting edges 71a, 71b of diamond cutter 64 determine the cross-section of the mold cavities 58 on the roller, which in turn determines the cross-section of light extracting features 26 on light extracting film 20. As will be known to those with skill in the art, diamond cutters 64 must have adequate relief angles 72 to allow cutter 64 to plunge into the turning roller without the roller material coming into contact with the non-cutting faces of the cutter 64, which would result in swaging the roller material and possible substandard cut surface quality. Typical relief angles 72 ranges from approximately 7 degrees to approximately 25 degrees.

The light extracting features 26 and light extracting film 20 of the present invention are particularly advantageous for fabrication. As will be recognized by those skilled in the optical fabrication arts, it can be more difficult to form a surface with a curved cross-section, particularly for a microstructure that is on a film substrate. Tooling costs for fabricating surfaces with curved cross sections can be several times the cost for planar surfaces. In addition, cutters 64 for fabricating molds often wear most at the tip of the cutter 64, which forms the apex 34 of the light extracting features 26. Wear at the cutter tip can cause lowered surface finish quality, deformed mold cavities 58, and other manufacturing errors. By embedding the tip of the light extracting features 26 into an adhesive 36 or other means to optically couple the light extracting film 20 to the light guide, the cosmetic or optical impact of any incorrectly-formed apexes 34 of light extracting features 26 is minimized.

The tolerances for fabricating diamond cutters 64 play a critical role in the performance and performance variation of light extracting film 20 of the present invention. The cutting edges 71a, 71b of the cutter 64 principally determine the cross-sectional shape of the mold cavities 58 and light features 26, which in turn determines the angular light distribution from the light extracting feature 26 and light extracting film 20. Hence variations in cutter 64 shape lead directly to variations in light extracting film 20 performance. As noted herein, the angle of cutting edge segments 71a, 71b can be held to tight tolerances by typical diamond-tool fabrication methods. However, as will be appreciated by those skilled in the art, when angles θ4 between cutting edge segments 71a, 71b become small, variations in the placement of each cutting edge segment 71a, 71b in its normal direction cause unacceptable changes in the lengths of cutting edge segments 71a, 71b. For example, the normal direction 73 for cutting edge 71a is shown. Depending on the angle θ4, variation in placing cutting edge 71a in its normal direction 73 will cause different amounts of variation in the length of cutting edge 71a and 71b. If cutting edge 71a is displaced by an amount d1 in its normal direction 73, then the length of cutting edge 71a will change by a distance d2, where the following equation holds:

$$d2=d1/\tan\theta 4 \quad (4)$$

Figure 20:
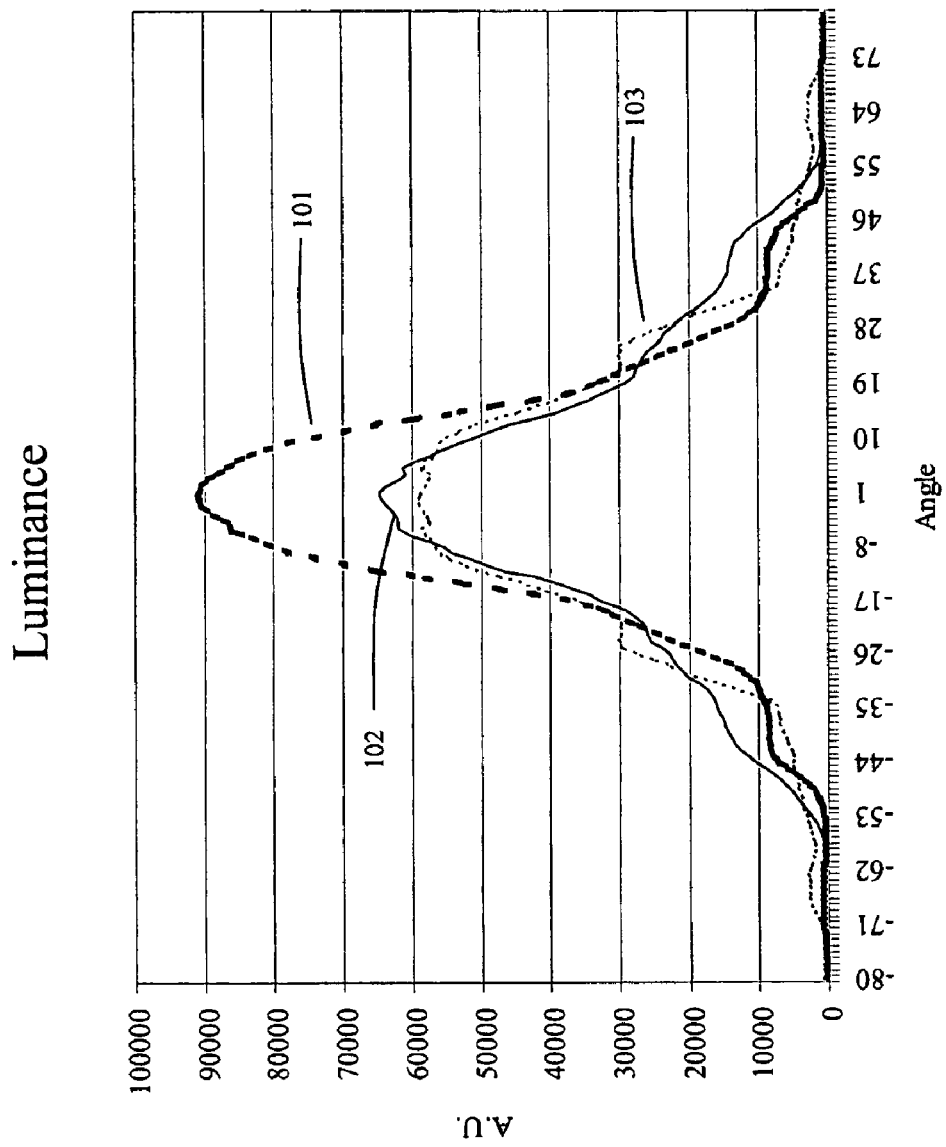
FIG. 20 is a graphical representation of viewing angle versus luminance of a film of an example embodiment with known manufacturing errors.

Diamond tool fabrication methods can place cutting edges 71a, 71b to within approximately 0.5 micrometers in the normal direction 73. In testing and optical simulations, variations of more than about 4 micrometers in the length of planar segments 31a, 31b cause unacceptable variations in angular light distribution. The simulation data in FIG. 20 shows one example in which the length of planar segments 31a, 31b are varied by 4 micrometers from the optimal value. Curve 101 shows the luminance distribution when the length of planar segments 31a, 31b are as designed. Curve 102 shows the luminance distribution when planar segment 31a is 4 micrometers shorter than optimal, and curve 103 shows the luminance distribution when planar segment 31a is 4 micrometers longer than optimal. It will be appreciated that a significant drop in on-axis brightness occurs when the length of planar segments 31a, 31b is varied more than 4 micrometers from the optimal value. As a result, there is a range that the length of planar segments 31a, 31b should satisfy for optimal optical performance. Solving equation (4) for θ4 shows that when the angles between planar segments are lower than approximately 7 degrees, the cutting edges 71a, 71b and planar segments 31a, 31b cannot be held within acceptable tolerance limits.

As another alternative, a flat mold for injection molding may be formed by a scribing process using diamond cutting tools described herein. A sleeve may also be mounted on a cylinder and engraved as described herein for fabricating a roller. Then the sleeve may be removed from the cylinder and unrolled to form the molding surface of a flat mold 56. Various replication processes known in the art, such as electroforming, may be used to copy and transform the mold 56 surface into a usable form.

Figure 21:
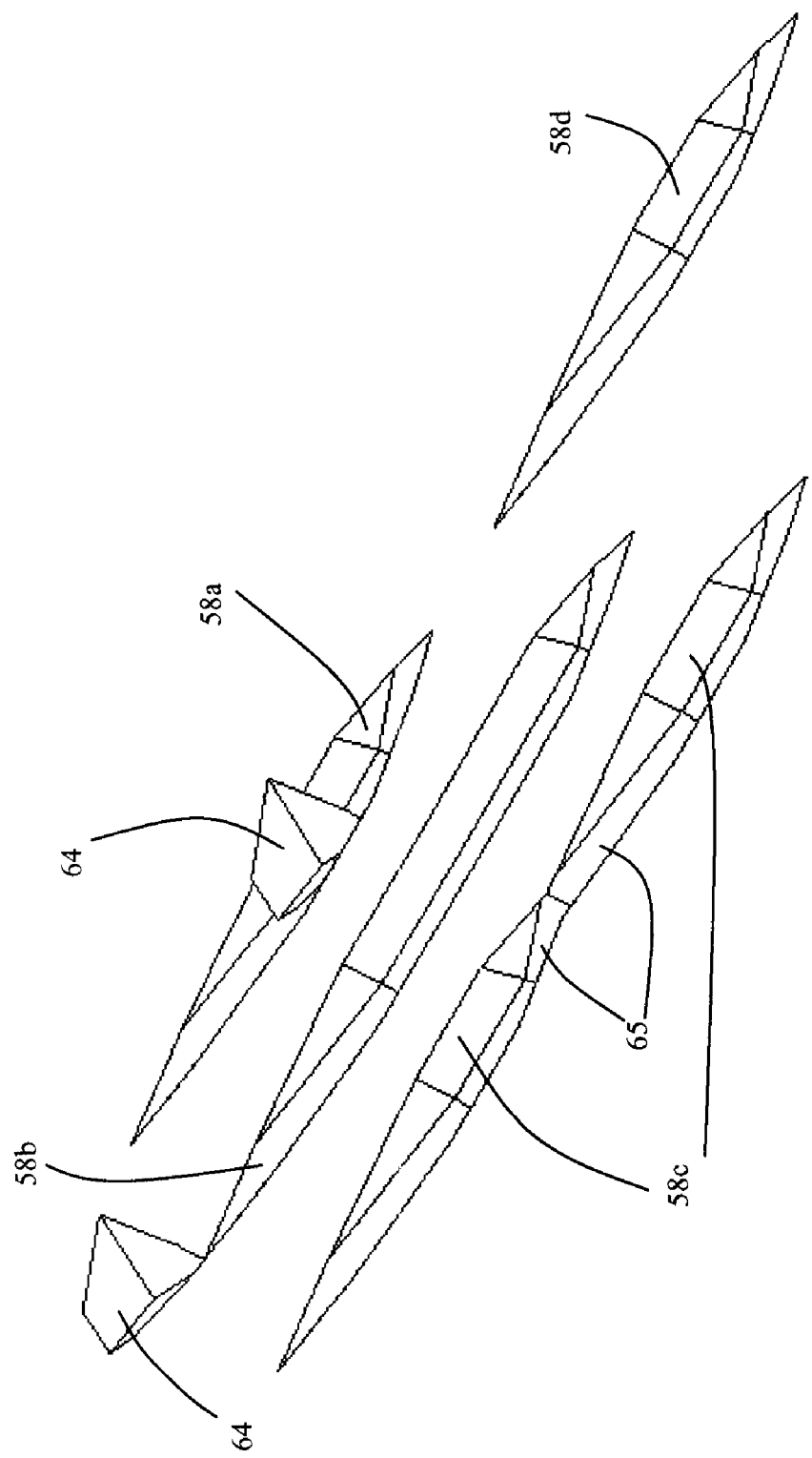
FIG. 21 is a perspective view of a cutter cutting example features in a mold in accordance with an example embodiment.

FIG. 21 shows a perspective view of a diamond cutter 64 cutting mold cavities in the surface of a roller. Cutter 64 is shown at several locations in the process of cutting cavities of various sizes. At one location cutter 64 is in a short cavity 58a. At another location cutter 64 is shown at the start of a longer cavity 58b. Also shown are two cavities 58c whose ends 65 intersect such that cutter 64 never emerges fully from the surface until the end of the second cavity. Two cavities 58a and 58d are far enough apart that the cutter may exit completely between them.

In general, light extracting film 20 may be formed from a variety of materials. In a specific embodiment, light extracting film 20 is formed from an acrylic film; however, light extracting film 20 may be formed from any of various types of transparent materials, including, but not limited to polycarbonate, polyethylene terephthalate (PET), polyethylene naphthalate (PEN), or polymethyl methacrylate (PMMA).

Suitable optical adhesives would be provided for the layer of optical adhesive 36. The index of refraction of optical adhesive 36 preferably matches that of light extracting film 20 and light guide 12.

Figure 22B:
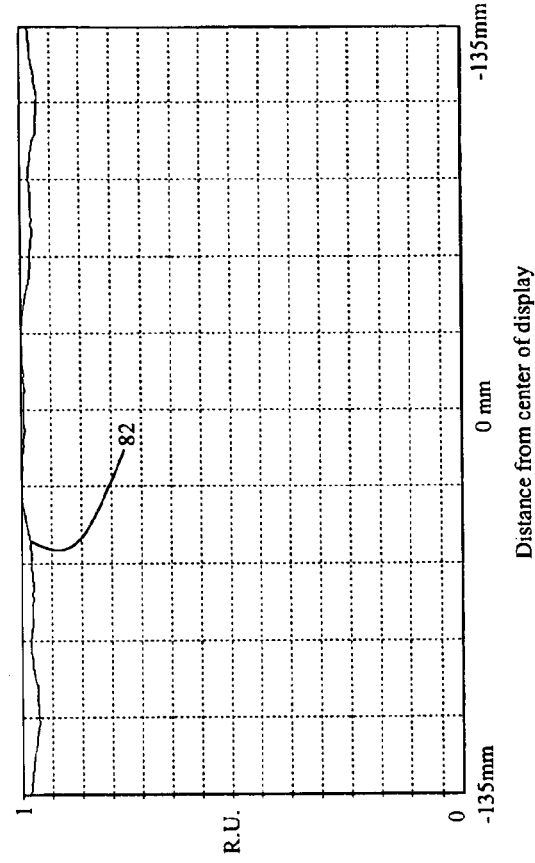
FIG. 22B is a graphical representation of luminance versus distance from a CCFL light source in accordance with an example embodiment.
Figure 22A:
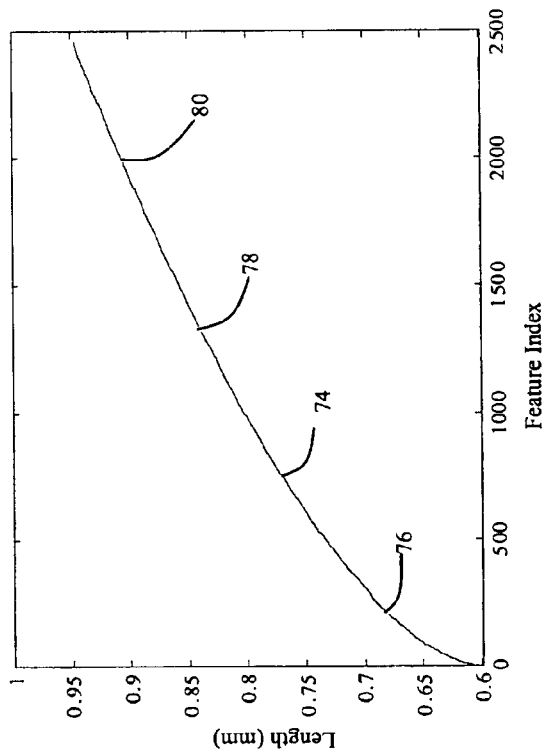
FIG. 22A is a graphical representation of the feature index from an edge of a film versus feature length in accordance with an example embodiment.

FIG. 22A is a graphical representation of the feature index (feature number in y-direction from the end of light extracting film 20) versus optical contact ratio for an example embodiment. In this example the first pitch P and second pitch D are both constant across the light extracting film 20. Feature length in millimeters is used as a measure of optical contact ratio, but other methods discussed herein may be used as well. Curve 74 shows the feature index versus length for a light extracting film 20. At point 76, features relatively close to an edge of light extracting film 20 near a light source have a relatively short length. Such features may be those disposed near end portions 48 as shown in FIG. 13. At point 78, the features are longer, and may be features between the edge of light extracting film 20 and the central portion 46 shown in FIG. 13. At point 80, the length of a feature is significantly larger. The features are farther from the edge of light extracting film 20. Such features may be disposed near the central portion 46 of light extracting film 20 of the embodiment of FIG. 13.

FIG. 22B is a graphical representation of the spatial luminance versus distance from the center of light guide 12 for light extracting film 20 having the length variation of features set forth in FIG. 22A. As shown in a curve 82, over the distance, the spatial luminance substantially maintains the same intensity level.

Figure 23:
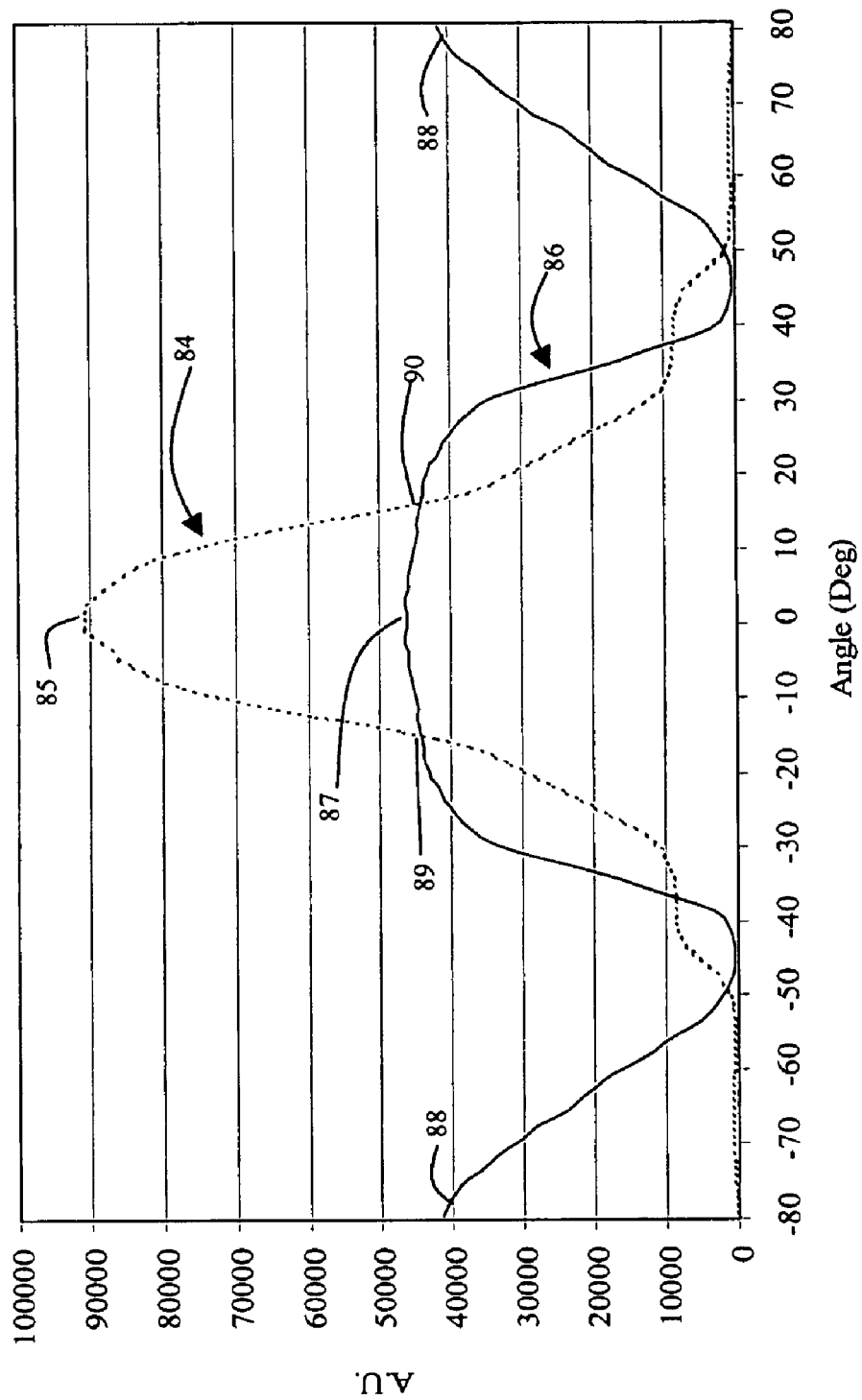
FIG. 23 is a graphical representation of viewing angle versus luminance of a film of an example embodiment and a known brightness enhancement film (BEF) layer.

FIG. 23 is a graphical representation of light intensity versus viewing angle. A curve 84 is the luminance (relative scale) versus vertical viewing angle (degrees) for light extracting film 20 in keeping with the example embodiments. Here the vertical direction is measured in the y-z plane shown in FIG. 13. Notably, two light sources 14 (for example, CCFLs) are disposed on both sides/edges of light extracting film 20 for light distribution. By comparison, a curve 86 is the luminance versus viewing angle for a known BEF.

As can be appreciated, a peak value 85 of the luminance is significantly greater than a peak value 87 of the luminance of the known BEF layer. Moreover, curve 86 includes side lobes 88. These side lobes 88 represent regions of brightness and thus light leakage at the extreme viewing angles.

The width of the peak luminance is often used to characterize light redirecting and light extracting articles. In the example embodiment, the width of the peak is between points 89 and 90 and has an angular breadth (Full Width Half-Maximum (FWHM)) of approximately 35.0 degrees.

Figure 24:
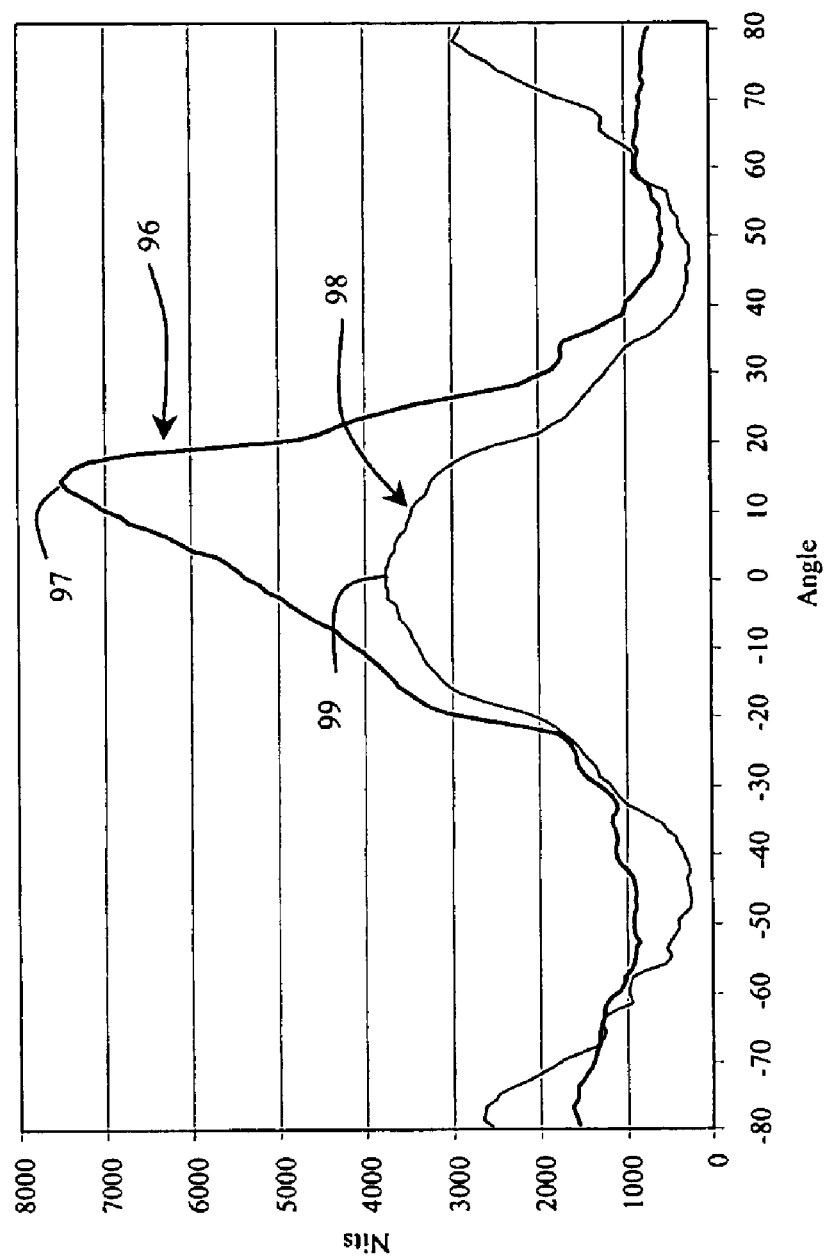
FIG. 24 is a graphical representation of viewing angle versus measured luminance of a film in accordance with an example embodiment compared to the measured luminance of a known BEF layer.

FIG. 24 is a graphical representation of luminance versus viewing angle of an example backlight device utilizing a light extracting film 20 of an example embodiment and a comparable backlight device utilizing two crossed known BEF layers. Both backlights included a single CCFL light source 103 along one edge. A curve 96 is the luminance of the backlight for light extracting film 20 measured at the center of the display. A curve 98 is the luminance of the BEF backlight measured at the center of the display. As can be appreciated, a peak value 97 of the luminance of the backlight is significantly greater than a peak value 99 of the luminance of the known BEF layer backlight.

Figure 25:
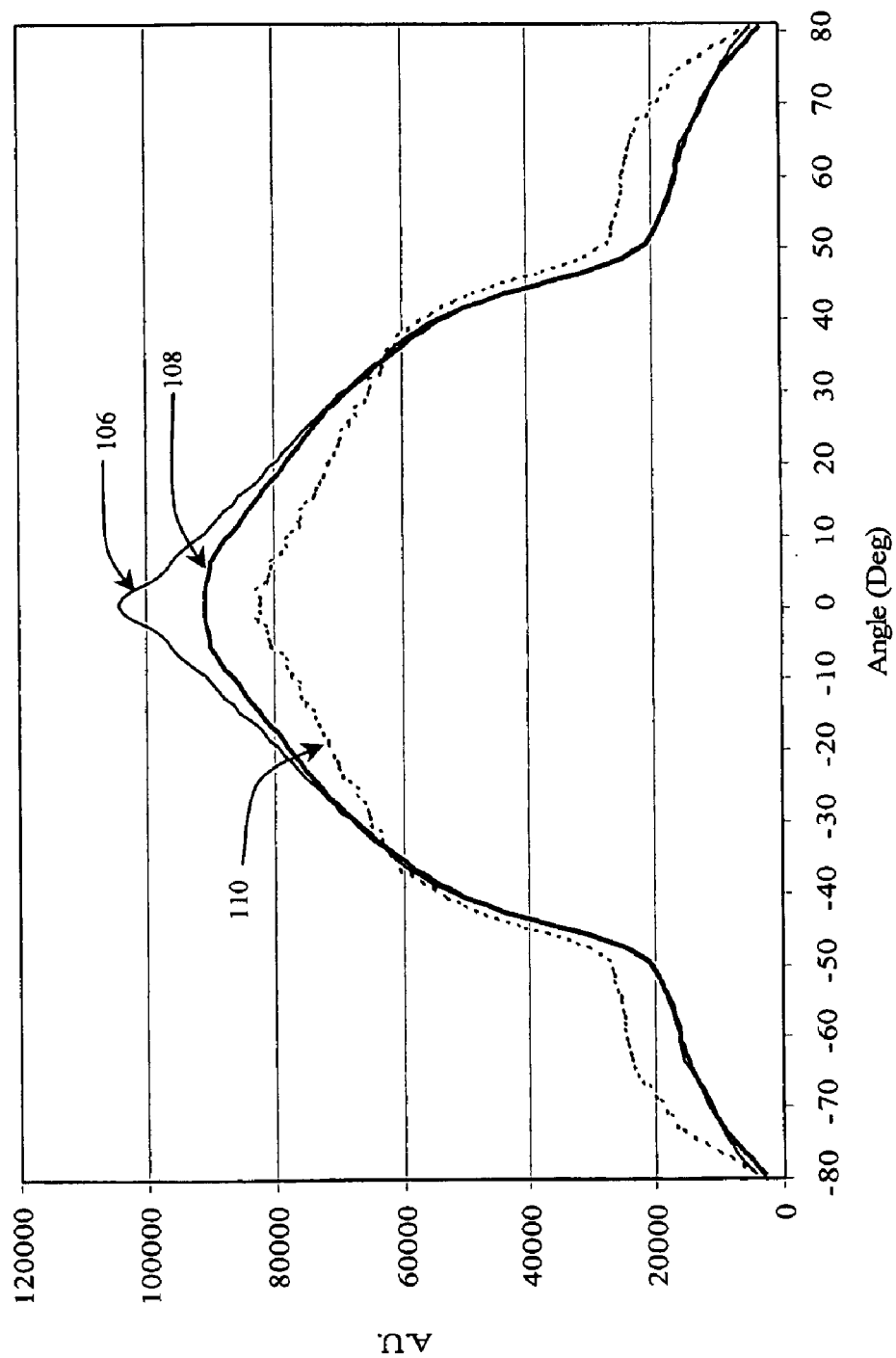
FIG. 25 is a graphical representation of viewing angle versus luminance of a film of an example embodiment.

FIG. 25 is a graphical representation of luminance versus horizontal viewing angle of an example backlight device with different apex angles of bottom prismatic shapes on microstructured layer 42 of FIG. 11. Here the horizontal direction is parallel to the x-axis in FIG. 12. FIG. 25 illustrates how the horizontal viewing angle as well as the peak luminance can be adjusted by changing the apex angle of the bottom prisms. A curve 106 is the luminance when the apex angle is 90 degrees. A curve 108 is the luminance when the apex angle is 150 degrees. A third curve 110 is the luminance when there is no bottom prism structure. As shown, the bottom prismatic structure collects more light into smaller viewing angle so that it increases peak brightness.

Figure 26:
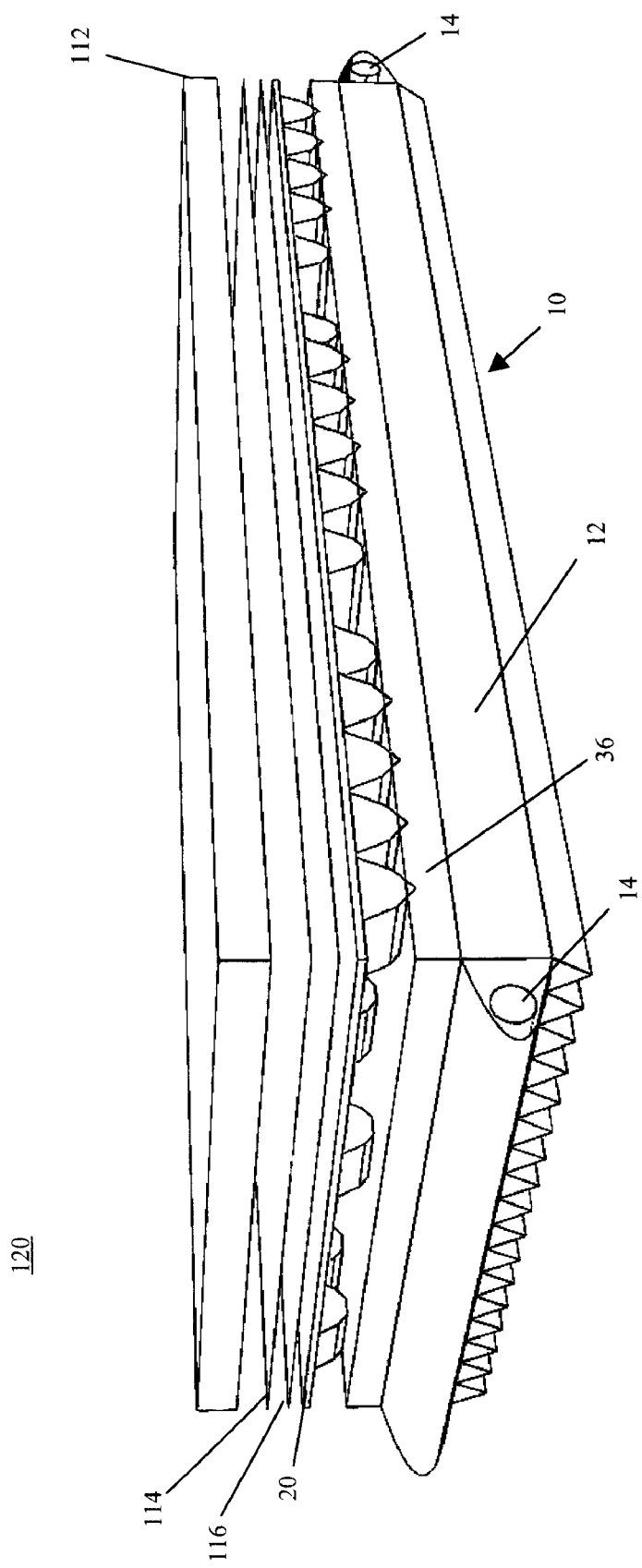
FIG. 26 is a perspective view of a display device in accordance with an example embodiment.

The perspective view of FIG. 26 shows a display apparatus 120 that employs light extracting film 20 in one embodiment. Illumination apparatus 10 has light guide 12 optically coupled with one or more light sources 14. Light extracting film 20, formed according to the present invention, is optically coupled to light guide 12 through adhesive layer 36. Other components may be provided for further conditioning of light from light extracting film 20, such as a diffuser 114 and reflective polarizer 116, for example. Reflective polarizer 116 transmits a portion of the light having a polarization state parallel to its transmission axis. A light gating device 112 modulates incident light from light extracting film 20 and any other intervening light conditioning components in order to form an image. Light gating device 112 may be any of a number of types of spatial light modulator, such as a liquid crystal (LC) spatial light modulator for example.

Figure 27A:
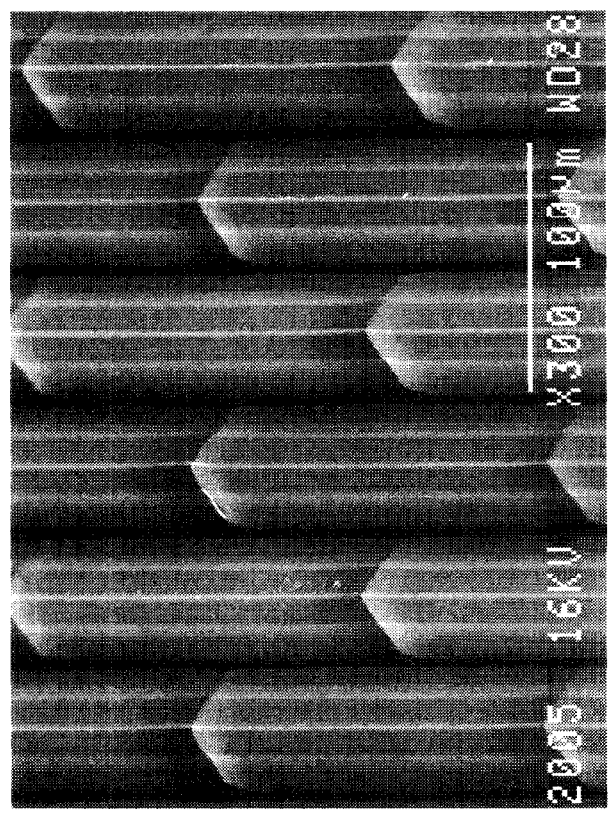
FIGS. 27A and 27B are scanning electron micrographs of a light extracting film in accordance with an example embodiment.
Figure 27B:
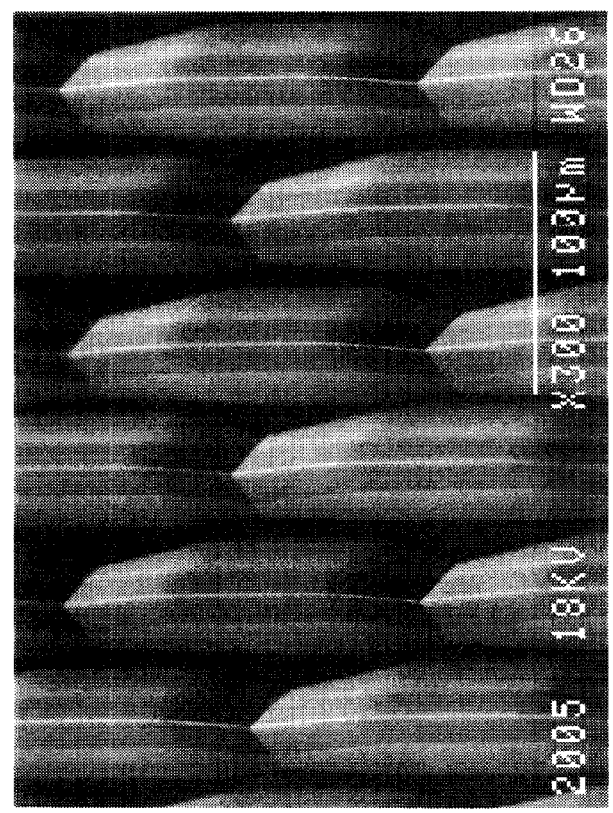

FIGS. 27A and 27B show scanning electron micrographs of the input surface 22 (such as shown in FIG. 1) at two locations of an example light extracting film 20 according to one embodiment. In this example, the two sides 28, 32 of the light extracting features 26 each have two planar segments 30a, 30b. Each light extracting feature 26 is 50 micrometers wide, and the pitch P in the y direction (see FIG. 12; shown horizontally in FIGS. 27A and 27B) is a constant 55 micrometers, leaving an approximately 5 micrometer wide flat region 40 (see FIG. 5) between the light extracting features 26. The pitch D in the longitudinal x direction (shown vertically in FIGS. 27A and 27B) is 250 micrometers. The light extracting features 26 have sloped ends 41 (see FIG. 8B) that overlap with the sloped ends 41 of neighboring light extracting features 26 in the x direction. FIG. 27A shows a location of the light extracting film 20 wherein the optical contact ratio is lower and the light extracting features 26 are approximately 150 micrometers in length. FIG. 27B shows a location of the light extracting film 20 wherein the optical contact ratio is higher and the light extracting features 26 are approximately 220 micrometers in length.

Figure 28:
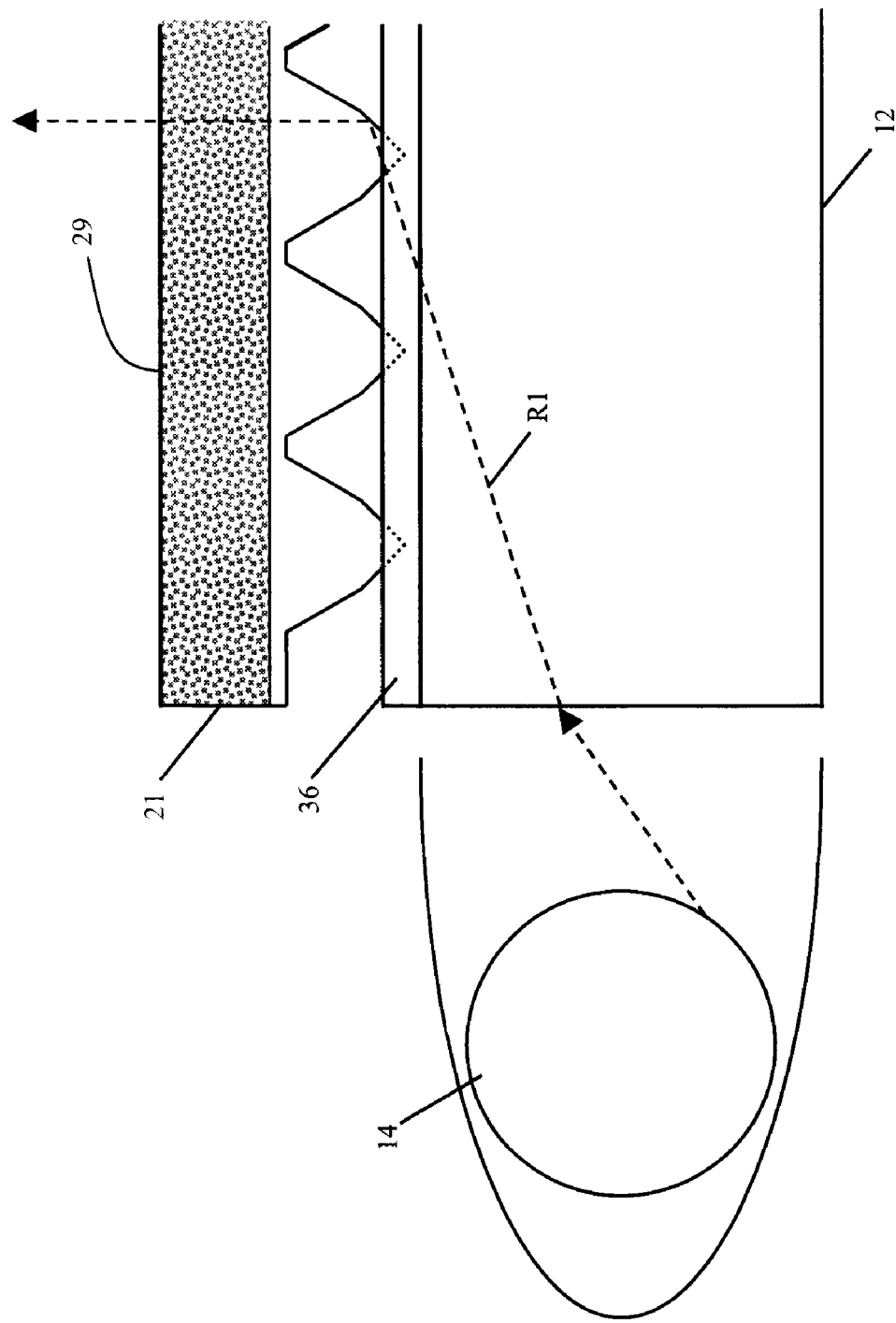
FIG. 28 is a cross-section view showing light traveling from the light source through the light guide and diffusing and light extracting film in accordance with an example embodiment.

In order to obtain light from light guide 12, light extracting features 26 must be optically coupled with the surface of light guide 12. Referring to FIG. 28, optical coupling is obtained using a layer of optical adhesive or other bonding agent 36 that has an index of refraction closely matched to the index of refraction n of light guide 12 and light extracting features 26. Use of the layer of optical adhesive 36 is advantageous for optical coupling, helping to compensate for dimensional tolerance errors in fabrication of light extracting features 26 and providing some allowance for varying the surface area for incident light obtained from light guide 12. Light extracting feature 26 is partially embedded in the optical adhesive 36 so that optical coupling occurs between light guide 12 and light directing feature 26. With embedment in optical adhesive 36, optical coupling occurs over an area that lies along the tilted planar segments 30b and 31b, closest to apex 34. Therefore, the level of embedment in optical adhesive 36 determines the effective area used for receiving light from light guide 12. It is important to notice that the same tilted planar segments 30b and 31b are also used to direct incident light using total internal reflection (TIR). As shown by the ray trace, R1, light is extracted from the light guide 12, and directed using TIR toward the output surface. In FIG. 28 the ray R1 is diffused by the diffusing substrate 29. This illustrates that diffusing and light extracting film 21 can effectively extract and direct light from light guide 12 and provide diffuse light output, reducing the need for a diffuser in another location with in the backlight structure.

Figure 29A:
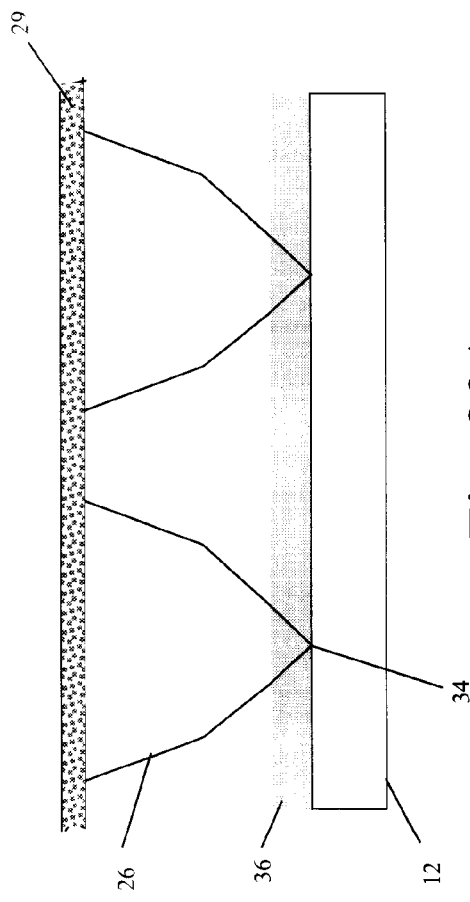
FIGS. 29A and 29B are cross-section views of different embodiments of the diffusing and light extracting film, with the feature inserted into an adhesive layer.
Figure 29B:
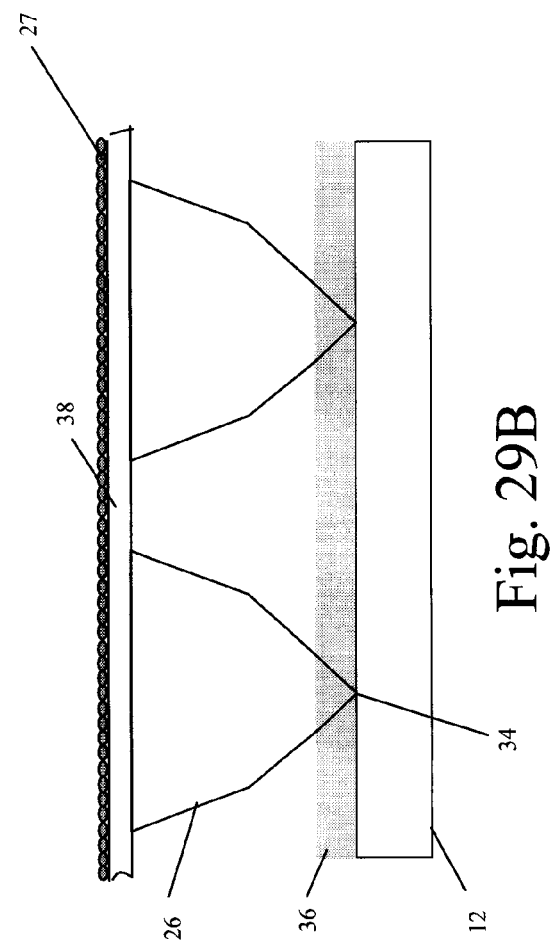

As shown in the example of FIG. 29A, the light extracting features 26 may be formed on a diffusing substrate 29. The light extracting features 26 would be used in any manner previously described. For example, FIG. 29A shows apex 34 touching the surface of light guide 12 with the layer of optical adhesive 36 used to hold light extracting features 26 in place and to provide a suitably sized input aperture for light extracting features 26. In an alternative embodiment shown in FIG. 29B, the light extracting features 26 may be formed on a film substrate 38, and a diffusive coating 27 applied. The diffusive coating 27 may be applied to the substrate 38 prior to forming the light extracting features. In another embodiment, the diffusive coating may be coated onto a light extracting film 20 in order to form diffusing and light extracting film 21; this light extracting film 20 may contain a film substrate or may be formed as a monolithic film.

Figure 29C:
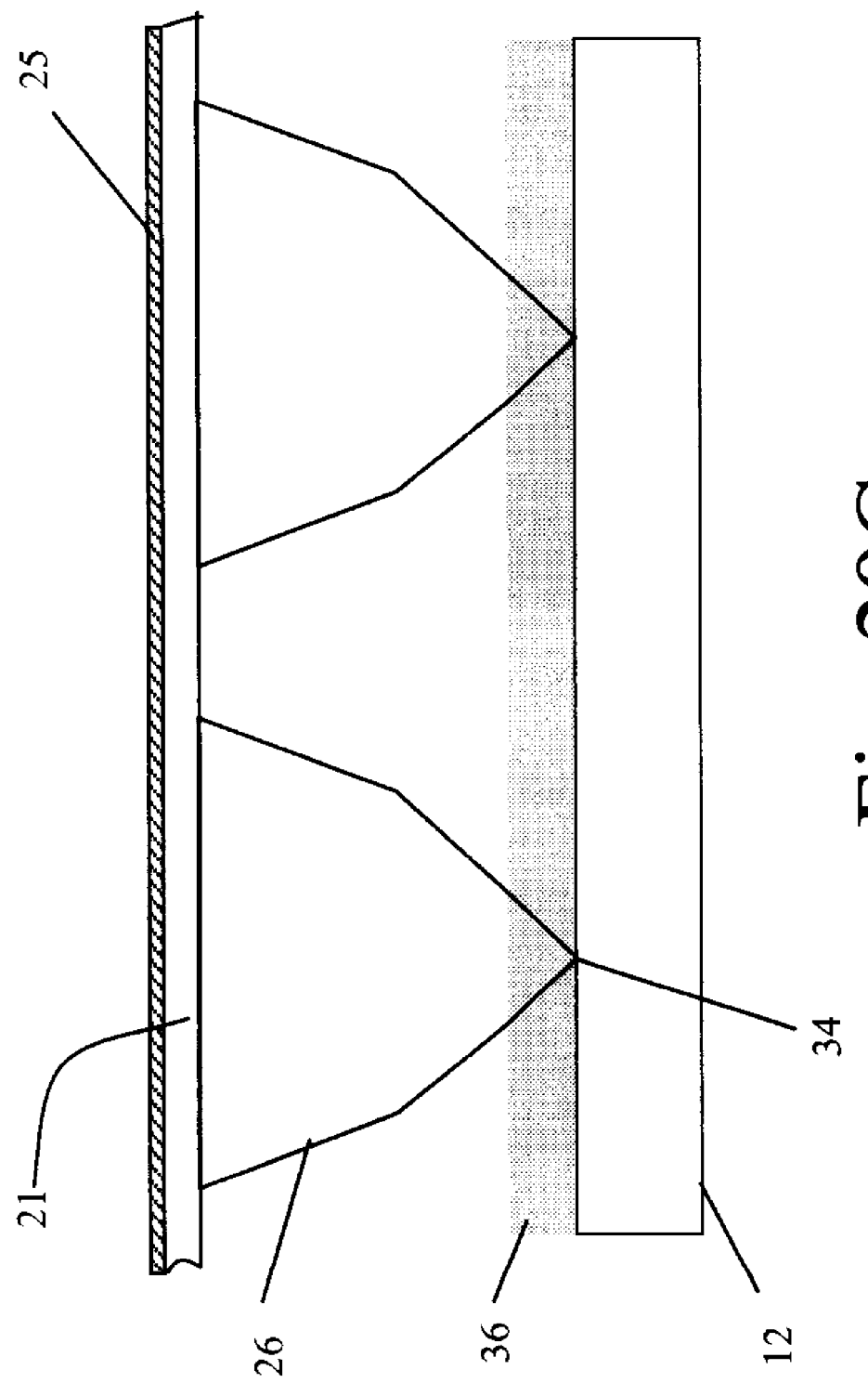
FIG. 29C is a cross-section view of the light extracting film with a functional coating, and the feature inserted into an adhesive layer.

A functional coating may optionally be added to light extracting film 20. Functional coatings include anti-reflective, antistatic, hard coat, and other coatings known in the art. Functional coatings can serve any purpose in the integrated film including optical or physical. For example, a coating may be applied in order to reduce stress and provide dimensional stability. FIG. 29C shows an alternative embodiment where the functional coating 25 is added to the diffusing and light extracting film 21. Diffusing and light extracting film 21 of FIG. 29C and light extracting film 20 may be chosen from any embodiment of the present invention.

Figure 30:
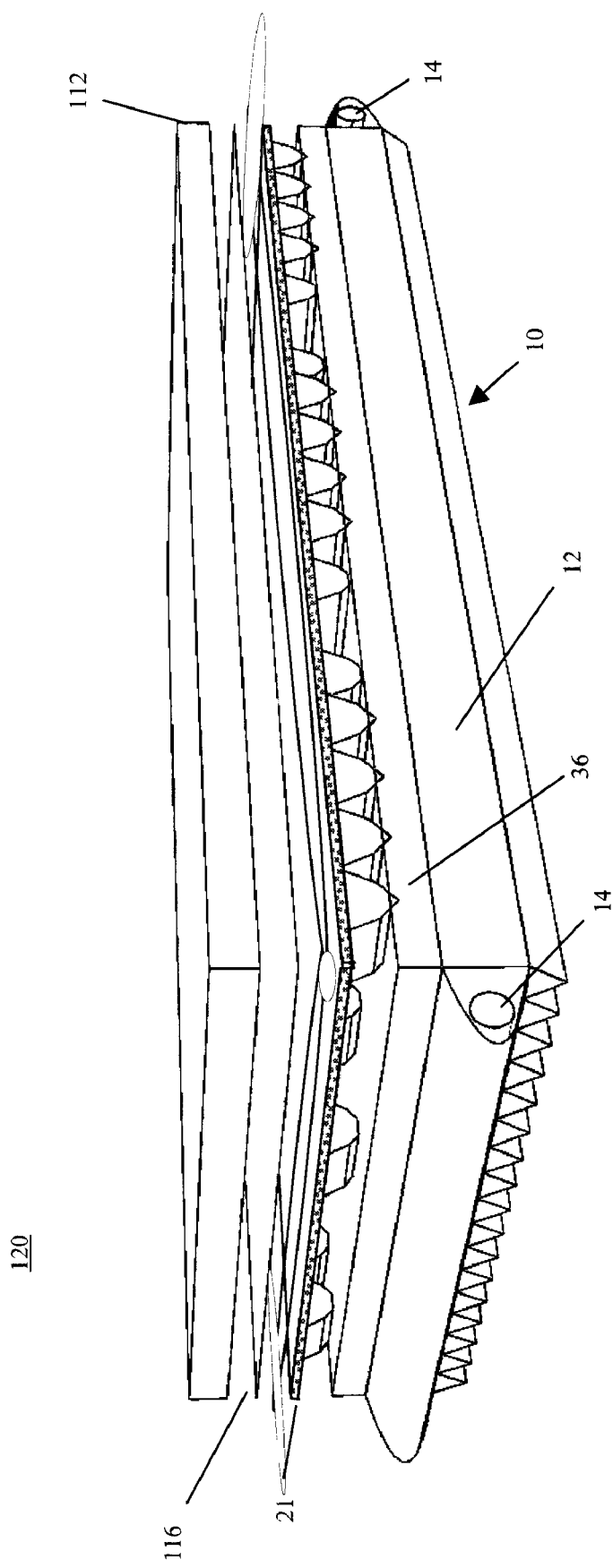
FIG. 30 is a perspective view of a display device in accordance with an example embodiment.

The perspective view of FIG. 30 shows an alternate embodiment of display apparatus 120 that employs diffusing and light extracting film 21. As in FIG. 26, illumination apparatus 10 has light guide 12 optically coupled with one or more light sources 14. Diffusing and light extracting film 21, formed according to the present invention, is optically coupled to light guide 12 through adhesive layer 36. In this preferred embodiment, the diffuser 114 shown in FIG. 26 is not needed due to the integrated functionality of diffusing and light extracting film 21. Additional components may be provided such as a reflective polarizer 116. A light gating device 112 modulates incident light from diffusing and light extracting film 21 and any other intervening components in order to form an image. Light gating device 112 may be any of a number of types of spatial light modulator, preferably a liquid crystal (LC) spatial light modulator.

In view of this disclosure it is noted that the various methods and devices described herein can be implemented in a variety of applications. Further, the various materials, elements and parameters are included by way of example only and not in any limiting sense. In view of this disclosure, those skilled in the art can implement the present teachings in determining their own techniques and needed equipment to affect these techniques, while remaining within the scope of the appended claims.

PARTS LIST

10. Illumination apparatus
12. Light guide
14. Light source
16. Top surface
18. Bottom surface
20. Light extracting film
21. Diffusing and light extracting film
22. Input surface 24. Output surface
25. Functional coating
26. Light extracting feature
27. Diffusive coating
28. Side
29. Diffusing substrate
30a, 30b, 31a, 31b, 31c. Planar segment
32. Side
33. End face
34. Apex
35. End region
36. Optical adhesive
37. Slope angle
38. Film substrate
39. Central portion
40. Flat region
41. End
42. Micro-structured layer
43. Optical adhesive
44. Light accepting surface
46. Central portion
48. End portion
50. Upper region
52. Lower region
54. Feature
56. Mold
58, 58a, 58b, 58c, 58d, 58e. Cavity
60. Roller surface
61, 62, 63. Sloped end
64. Cutter
65. End
66, 67, 68. Position
70. Tip
71a, 71b. Cutting edges
72. Angle
73. Normal direction
74. Curve
76, 78, 80. Point
82. Curve
84. Curve
86. Curve
85, 87. Peak value
88. Side lobe
89, 90. Point
96, 98. Curve
97, 99. Peak value
101, 102, 103. Curve
106, 108, 110. Curve
112. Light gating device
114. Diffuser
116. Reflective polarizer
120. Display apparatus
R1. Ray
$\theta 1, \theta 2, \theta 3, \theta 4$. Angle
N. Normal axis
P. Pitch
L, L1, L2. Length
D. Pitch
G. Gap

The invention claimed is:
1. An illumination apparatus comprising:
(a) at least one light source;
(b) a light guide for accepting light from the at least one light source and for guiding the light using total internal reflection, the light guide having a top surface;
(c) a light extracting film having an input surface optically coupled with the top surface and an output surface for providing light,
wherein the input surface comprises a plurality of light extracting features which are optically coupled to the top surface of the light guide, at least some light extracting features having:
(i) a first side comprising two or more planar segments; and
(ii) a second side comprising two or more planar segments, and wherein the first and second sides intersect at an apex.

2. The illumination apparatus of claim 1 wherein the light extracting features are optically coupled to the light guide by being partially embedded in an optical adhesive.

3. The illumination apparatus of claim 2 wherein the area of optical coupling is a function of the area of the light extracting feature in contact with the optical adhesive.

4. The illumination apparatus of claim 2 wherein there is present a material in contact with both the optical adhesive and the light extracting features that has a relatively low refractive index compared to that of the adhesive and the light extracting features in order to allow total internal reflection (TIR) on the surface of the light extracting features.

5. The illumination apparatus of claim 4 wherein the relatively low refractive index material is air.

6. The illumination apparatus of claim 1 wherein the light extracting features have a longitudinal axis and wherein each of at least two of the features extends in the direction of its longitudinal axis, and wherein their respective longitudinal axes are substantially in parallel with each other and in parallel with the plane of the top surface of the light guide.

7. The illumination apparatus of claim 1 wherein all or part of the apexes of intersection of the first and second sides lie along a line parallel to the plane of the top surface of the light guide.

8. The illumination apparatus of claim 1 wherein the angle $\theta 3$ formed at the apex of intersection is in the range of 61 degrees to 120 degrees.

9. The illumination apparatus of claim 1 wherein an optical contact ratio between the light guide and the light extracting film is greater over a central portion of the light guide than over an end portion.

10. The illumination apparatus of claim 2 wherein the index of refraction of the adhesive differs from the index of refraction of the features by no more than 0.02.

11. The illumination apparatus of claim 1 wherein the light guide has a bottom surface opposite the top surface, the bottom surface comprising a plurality of microstructures that are substantially elongated in one direction.

12. The illumination apparatus of claim 11 wherein the microstructures are prismatic, arcuate, semi-circular, conic, aspheric, trapezoidal, or a composite of at least two shapes in cross-section.

13. The illumination apparatus of claim 1 additionally comprising additional optically functional layers.

14. The illumination apparatus of claim 13 wherein the additional layers comprise a diffuser, a polarizer, or a brightness enhancer.

15. The illumination apparatus of claim 1 wherein the light extracting film is also a diffusing film.

16. The illumination apparatus of claim 15 wherein the light extracting film is rendered diffusive by the presence of a diffusive coating.

17. The illumination apparatus of claim 15 wherein the light extracting film is rendered diffusive by the presence of a diffusive substrate.

18. A light extracting film having an input surface for being optically coupled with the top surface of a light guide and an output surface for providing light, wherein the input surface comprises a plurality of light extracting features, each light extracting feature comprising:
(i) a first side comprising two or more planar segments; and
(ii) a second side comprising two or more planar segments, wherein the first and second sides intersect at an apex, and at least two of the light extracting features have lengths that are much smaller than the dimension of the light extracting film measured in the same direction.

19. The light extracting film of claim 18 wherein at least two of the light extracting features have different lengths.

20. The light extracting film of claim 18 wherein the light extracting features have end portions that are sloped or curved.

21. The light extracting film of claim 18 wherein, for at least one light extracting feature, the first and second sides are substantially bilaterally symmetrical.

22. The light extracting film of claim 18 wherein the light extracting features are attached to a film substrate.

23. A display apparatus comprising:
(a) at least one light source;
(b) a light guide for accepting light from the at least one light source and for guiding the light using total internal reflection, the light guide having a top surface;
(c) a light extracting film having an input surface optically coupled with the top surface and an output surface for providing light; and
(d) a light gating device for modulating the light to form an image thereby,
wherein the input surface comprises a plurality of light extracting features which are optically coupled to the top surface of the light guide, each light extracting feature having:
(i) a first side comprising two or more planar segments; and
(ii) a second side comprising two or more planar segments, and wherein the first and second sides intersect at an apex.

24. An illumination apparatus comprising:
(a) at least one light source;
(b) a light guide for accepting light from the at least one light source and for guiding the light using total internal reflection;
(c) a light extracting film having an input surface optically coupled with the light guide and an output surface parallel to the input surface for providing light,
wherein the input surface comprises a plurality of light extracting features which are optically coupled to the light guide, such features being extended in a longitudinal direction and having a cross section in the plane perpendicular to the longitudinal direction, the cross section comprising
(i) a first side comprising at least two but not more than six linear segments, and
(ii) a second side comprising at least two but not more than six linear segments,
wherein at least one of the plurality of light extracting features has a length measured in the longitudinal direction that is less than the length of the light extracting film measured in the longitudinal direction.

25. The illumination apparatus of claim 24 wherein the first and second sides intersect at an apex.

26. The illumination apparatus of claim 24 wherein the first and second sides intersect in a curved surface.

27. The illumination apparatus of claim 24 wherein the first and second sides intersect at a small rounded or chamfered tip.

28. The illumination apparatus of claim 24 wherein the lengths of at least two of the light extracting features are at least 100 times shorter than the length of the light extracting film measured in the same direction.

29. The illumination apparatus of claim 24 further comprising an adhesive layer for coupling the light extracting film to the light guide.

30. The illumination apparatus of claim 24 wherein the slope from each linear segment to the next linear segment varies by more than 7 degrees.

31. The illumination apparatus of claim 24 further comprising a microstructured layer disposed on the light guide opposite the light extracting film, wherein the microstructured layer comprises a plurality of microstructures extending in a direction perpendicular to the longitudinal direction.

32. The illumination apparatus of claim 24 wherein an optical contact ratio between the light guide and the light extracting film varies in the longitudinal direction.

33. The illumination apparatus of claim 24 wherein the cross section is substantially constant over the length of the optical contact region of each light extracting feature.

34. The illumination apparatus of claim 2 wherein, for at least two of the light extracting features, the apex is in contact with the light guide.

\* \* \* \* \*